US007555745B2

(12) United States Patent
Iwashita

(10) Patent No.: US 7,555,745 B2
(45) Date of Patent: Jun. 30, 2009

(54) PROGRAM AND APPARATUS FOR TRANSLATING LANGUAGE, AND PROGRAM CONVERTING METHOD

(75) Inventor: Hidetoshi Iwashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 10/992,353

(22) Filed: Nov. 18, 2004

(65) Prior Publication Data

US 2006/0010432 A1    Jan. 12, 2006

(30) Foreign Application Priority Data

Jul. 9, 2004    (JP) ............................. 2004-203063

(51) Int. Cl.
*G06F 9/44* (2006.01)
*G06F 9/45* (2006.01)
(52) U.S. Cl. ..................... 717/137; 717/107; 717/108; 717/114; 717/119; 717/149; 717/150
(58) Field of Classification Search ....................... None
See application file for complete search history.

(56) References Cited

U.S. PATENT DOCUMENTS 5,414,849 A * 5/1995 Yamamoto ................. 717/149
6,106,575 A * 8/2000 Hardwick .................. 717/119
6,243,863 B1 * 6/2001 Kothari et al. ............. 717/149

OTHER PUBLICATIONS

"High Performance Fortran Language Specification"; High Performance Fortran Forum Version 2.0; Jan. 31, 1997.
"High Performance Fortran 2.0 Official Manual"; Springer-Verlag Tokyo (ISBN4-431-70822-7); Jan. 31, 1999.
"HPF/JA Language Specification Version 1.0"; Japan Assoc. for High Performance Fortran; Nov. 11, 1999.
"OpenMP Fortran Application Program Interface Version 2.0"; Open MP Architecture Review Board; Nov. 2000.
"OpenMP C/C++Application Program Interface Version 1.0"; OpenMP Architecture Review Board; Oct. 1998.

* cited by examiner

*Primary Examiner*—Chuck O Kendall
(74) *Attorney, Agent, or Firm*—Greer, Burns & Crain, Ltd.

(57) ABSTRACT

A translator apparatus for analyzing a parallel language program and converting the parallel language program into a sequential language program that is subject to a distributed processing by a plurality of processors includes a parameter generating unit that generates a setting code for setting a value in a distribution parameter; and an index localizing unit that generates a localizing code for localizing a loop index and an array index based on the distribution parameter of which the value is set by the setting code generated.

15 Claims, 38 Drawing Sheets

FIG.1A

```
    real a(0:249,1:1000)

do j=2,1000
      do i=0,249
        a(i,j)=a(i,j)+a(i,j-1)
      end do
    end do
    end
```

FIG.1B

```
      real a(0:11,0:999)
      integer,parameter ::
    & MAP(12)=(/2,1,3,4,3,2,4,4,1,2,2,4/)
      integer mapArray(0:11), gtol(0:12), ltog(0:11)
!--- INITIALIZATION
      do I=0,11
        mapArray(I)=MAP(I-1)-1
      end do
      gtol(0) = 0
      i = 0
      do k=0,11
        if (myID.EQ.mapArray(k)) then
          ltog(i) = k
          i = i+1
        end if
        gtol(k+1) = i
      end do !--- EXECUTION
      do j=1,1000
        do i=gtol(M),gtol(N+1)-1
          a(i,j) = a(i,j)+ltog(i)*a(i,j-1)
        end do
      end do
      end
```

FIG.1C

```
        real a(0:11,0:999)
        integer,parameter ::
     &  MAP(12)=(/2,1,3,4,3,2,4,4,1,2,2,4/)
        integer mapArray(0:11), gtol(0:12), ltog(0:11)
!--- INITIALIZATION
        do I=0,11
           mapArray(I)=MAP(I-1)-1
        end do
        gtol(0) = 0
        i = 0
        do k=0,11
           if (myID.EQ.mapArray(k)) then
              ltog(i) = k
              i = i+1
           end if
           gtol(k+1) = i
        end do !--- EXECUTION
        do j=1,1000
           do i=gtol(M),gtol(N+1)-1
              a(i,j) = a(i,j)+ltog(i)*a(i,j-1)
           end do
        end do
        end
```

FIG.3

$$\text{gtol}(0) = 0$$

$$\text{gtol}(k) = \begin{cases} \text{gtol}(k-1)+1 & \text{for } 1 \leq k \leq N, \quad M(k-1) = p \\ \text{gtol}(k-1) & \text{for } 1 \leq k \leq N, \quad M(k-1) \neq p \end{cases}$$

FIG.4A

| BEFORE CONVERSION | AFTER CONVERSION |
|---|---|
| DO I=I1,I2,I3<br>   LOOP BODY<br>ENDDO | CODE FOR CALCULATING i1, i2, AND i3<br>DO I=i1,i2,i3<br>   LOOP BODY<br>ENDDO |

FIG.4B

| BEFORE CONVERSION | AFTER CONVERSION |
|---|---|
| DO I=I1,I2<br>   LOOP BODY<br>ENDDO | CODE FOR CALCULATING i1 AND i2<br>DO I=i1,i2<br>   LOOP BODY<br>ENDDO |

FIG.4C

| BEFORE CONVERSION | AFTER CONVERSION |
|---|---|
| DO I=I1,I2<br>   LOOP BODY<br>ENDDO | DO I=gtol(I1),gtol(I2+1)-1<br>   LOOP BODY<br>ENDDO |

FIG.5

- BEFORE CONVERSION
  ```
  DO I=I1,I2,I3
        ... ! loop body
  ENDDO
  ```
- AFTER CONVERSION (WHEN I3>0)
  ```
  DO I=I1,I2
        IF (MOD(I-I1,I3).EQ.0) THEN
           ... ! loop body
        ENDIF
  ENDDO
  ```
- AFTER CONVERSION (WHEN I3<0)
  ```
  DO I=I2,I1
        IF (MOD(I-I1,I3).EQ.0) THEN
           ... ! loop body
        ENDIF
  ENDDO
  ```

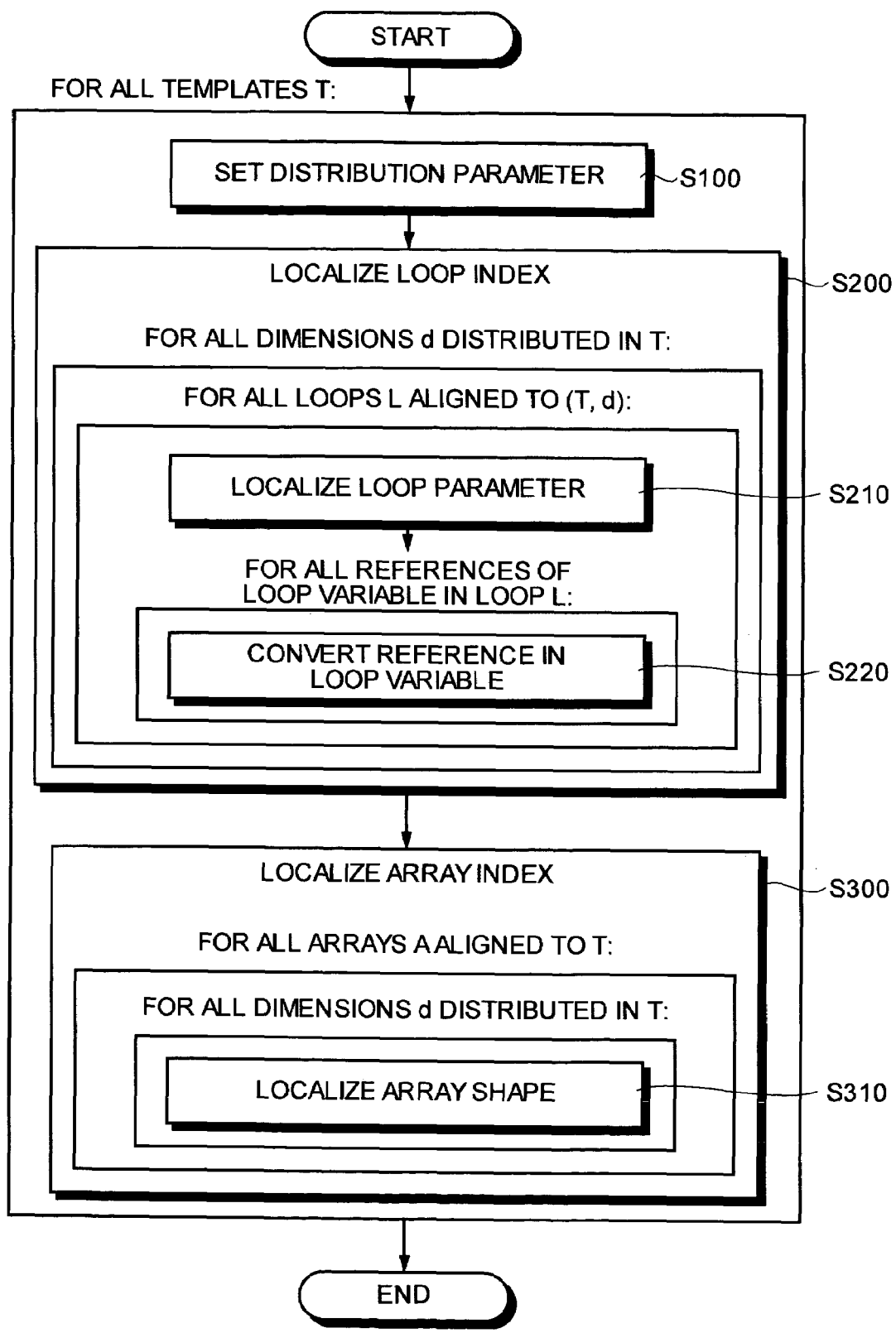

FIG.7

| CHAR-ACTER | NAME | MEANING |
|---|---|---|
| d | DISTRIBUTION TYPE | BLOCK DISTRIBUTION, CYCLIC DISTRIBUTION, UNEVEN BLOCK DISTRIBUTION, BLOCK-CYCLIC DISTRIBUTION, OR IRREGULAR DISTRIBUTION |
| P | NUMBER OF PROCESSORS | EXTENT OF DIMENSION REMARKED IN PROCESSOR GROUP |
| N | EXTENT OF ARRAY | EXTENT OF DIMENSION REMARKED IN ARRAY |
| w | BLOCK WIDTH | WIDTH OF BLOCK DISTRIBUTION IF NOT SPECIFIED, w=⌈N/P⌉ |
| W | BLOCK-WIDTH ARRAY | BLOCK WIDTH DUE TO UNEVEN BLOCK IN EACH PROCESSOR DISTRIBUTION |
| B | DISTRIBUTED LOWER BOUND | $B(p)=\text{sum}\{W(p)|0 \leq q < p\}$ |
| M | MAPPING ARRAY | PROCESSOR NUMBER CORRESPONDING TO EACH INDEX IN IRREGULAR DISTRIBUTION |

FIG.8

| DISTRIBUTION TYPE d | i = gtol(D,I) |
|---|---|
| BLOCK DISTRIBUTION | I - p w OR mod(I, w) |
| CYCLIC DISTRIBUTION | $\lfloor I / P \rfloor$ |
| UNEVEN BLOCK DISTRIBUTION | I - B(p) |
| BLOCK-CYCLIC DISTRIBUTION | $w \lfloor I / (P w) \rfloor + \text{mod}(I, w)$ |

FIG.9

| DISTRIBUTION TYPE d | I = ltog(D,i,p) |
|---|---|
| BLOCK DISTRIBUTION | i + p w |
| CYCLIC DISTRIBUTION | P i + p |
| UNEVEN BLOCK DISTRIBUTION | i + B(p) |
| BLOCK-CYCLIC DISTRIBUTION | $P w \lfloor i / w \rfloor + p w + \text{mod}(i, w)$ |

FIG.10A

BLOCK DISTRIBUTION $$i1 = \begin{cases} I1 - pw & \text{for } p \leq \lfloor I1/w \rfloor \\ 0 & \text{for } p > \lfloor I1/w \rfloor \end{cases}$$

$$i2 = \begin{cases} w - 1 & \text{for } p < \lfloor I2/w \rfloor \\ I2 - pw & \text{for } p \geq \lfloor I2/w \rfloor \end{cases}$$

ANOTHER METHOD OF REALIZING BLOCK DISTRIBUTION $$i1 = \begin{cases} w & \text{for } p < \lfloor I1/w \rfloor \\ I1 - pw & \text{for } p = \lfloor I1/w \rfloor \\ 0 & \text{for } p > \lfloor I1/w \rfloor \end{cases}$$

$$i2 = \begin{cases} w - 1 & \text{for } p < \lfloor I2/w \rfloor \\ I2 - pw & \text{for } p = \lfloor I2/w \rfloor \\ -1 & \text{for } p > \lfloor I2/w \rfloor \end{cases}$$

ANOTHER METHOD OF REALIZING BLOCK DISTRIBUTION

IT IS ALSO POSSIBLE TO ADD DISCRIMINATION SUCH THAT LOOP IS NOT EXECUTED AS FOLLOWS.

IF $p < \lfloor I1/w \rfloor$ OR $p > \lfloor I2/w \rfloor$, THEN SKIP LOOP

ANOTHER METHOD OF REALIZING BLOCK DISTRIBUTION

INSTEAD OF CONDITIONAL EXPRESSIONS:
$p < \lfloor I1/w \rfloor \quad p = \lfloor I1/w \rfloor \quad p > \lfloor I1/w \rfloor$
EXPRESSIONS:
$pw < I1 \quad pw = I1 \quad pw > I1$
MAY BE USED, RESPECTIVELY. SAME GOES FOR SIGNS OF INEQUALITY $\geq$ AND $\leq$.
SAME GOES FOR I2.

FIG.10B

UNEVEN BLOCK DISTRIBUTION $$i1 = \begin{cases} I1 - B(p) & \text{for } B(p) \leq I1 \\ 0 & \text{for } B(p) > I1 \end{cases}$$

$$i2 = \begin{cases} W(p) - 1 & \text{for } B(p+1) \leq I2 \\ I2 - B(p) & \text{for } B(p+1) > I2 \end{cases}$$

ANOTHER METHOD OF REALIZING UNEVEN BLOCK DISTRIBUTION $$i1 = \begin{cases} W(p) & \text{for } B(p) < I1 \\ I1 - B(p) & \text{for } B(p) = I1 \\ 0 & \text{for } B(p) > I1 \end{cases}$$

$$i2 = \begin{cases} W(p) - 1 & \text{for } B(p) < I2 \\ I2 - B(p) & \text{for } B(p) = I2 \\ -1 & \text{for } B(p) > I2 \end{cases}$$

ANOTHER METHOD OF REALIZING UNEVEN BLOCK DISTRIBUTION

IT IS ALSO POSSIBLE TO ADD DISCRIMINATION SUCH THAT LOOP IS NOT EXECUTED AS FOLLOWS.
IF $B(p) < I1$ OR $B(p) > I2$, THEN SKIP LOOP

CYCLIC DISTRIBUTION $$i1 = \lceil (I1 - p) / P \rceil$$
$$i2 = \lfloor (I2 - p) / P \rfloor$$

BLOCK-CYCLIC DISTRIBUTION $$i1 = \begin{cases} w \left\lfloor \dfrac{I1}{Pw} \right\rfloor + w & \text{for } p < \text{mod}(\lfloor I1/w \rfloor, P) \\ w \left\lfloor \dfrac{I1}{Pw} \right\rfloor + \text{mod}(I1, w) & \text{for } p = \text{mod}(\lfloor I1/w \rfloor, P) \\ w \left\lfloor \dfrac{I1}{Pw} \right\rfloor & \text{for } p > \text{mod}(\lfloor I1/w \rfloor, P) \end{cases}$$

$$i2 = \begin{cases} w \left\lfloor \dfrac{I2}{Pw} \right\rfloor + w - 1 & \text{for } p < \text{mod}(\lfloor I2/w \rfloor, P) \\ w \left\lfloor \dfrac{I2}{Pw} \right\rfloor + \text{mod}(I2, w) & \text{for } p = \text{mod}(\lfloor I2/w \rfloor, P) \\ w \left\lfloor \dfrac{I2}{Pw} \right\rfloor - 1 & \text{for } p > \text{mod}(\lfloor I2/w \rfloor, P) \end{cases}$$

FIG.11A

BLOCK DISTRIBUTION
  WHEN I3>0
    $i1 = \begin{cases} I1 - pw & \text{for } p \leq \lfloor I1/w \rfloor \\ \mod(I1 - pw, I3) & \text{for } p > \lfloor I1/w \rfloor \end{cases}$ $i2 = \begin{cases} w - 1 & \text{for } p < \lfloor I2/w \rfloor \\ I2 - pw & \text{for } p \geq \lfloor I2/w \rfloor \end{cases}$ $i3 = I3$ WHEN I3<0
    $i1 = \begin{cases} w - 1 - \mod(pw + w - 1 - I1, -I3) & \text{for } p < \lfloor I1/w \rfloor \\ I1 - pw & \text{for } p \geq \lfloor I1/w \rfloor \end{cases}$ $i2 = \begin{cases} I2 - pw & \text{for } p \leq \lfloor I2/w \rfloor \\ 0 & \text{for } p > \lfloor I2/w \rfloor \end{cases}$ $i3 = I3$ ANOTHER METHOD OF REALIZING BLOCK DISTRIBUTION
  WHEN I3>0
    $i1 = \begin{cases} w & \text{for } p < \lfloor I1/w \rfloor \\ I1 - pw & \text{for } p = \lfloor I1/w \rfloor \\ \mod(I1 - pw, I3) & \text{for } p > \lfloor I1/w \rfloor \end{cases}$ $i2 = \begin{cases} w - 1 & \text{for } p < \lfloor I2/w \rfloor \\ I2 - pw & \text{for } p = \lfloor I2/w \rfloor \\ -1 & \text{for } p > \lfloor I2/w \rfloor \end{cases}$ $i3 = I3$ WHEN I3<0
    $i1 = \begin{cases} pw + w - 1 - \mod(pw + w - 1 - I1, -I3) & \text{for } p < \lfloor I1/w \rfloor \\ I1 - pw & \text{for } p = \lfloor I1/w \rfloor \\ -1 & \text{for } p > \lfloor I1/w \rfloor \end{cases}$ $i2 = \begin{cases} w & \text{for } p < \lfloor I2/w \rfloor \\ I2 - pw & \text{for } p = \lfloor I2/w \rfloor \\ 0 & \text{for } p < \lfloor I2/w \rfloor \end{cases}$ $i3 = I3$ ANOTHER METHOD OF REALIZING BLOCK DISTRIBUTION
IT IS ALSO POSSIBLE TO ADD DISCRIMINATION SUCH THAT LOOP IS NOT EXECUTED AS FOLLOWS.
  WHEN I3>0
    IF $p < \lfloor I1/w \rfloor$ OR $p > \lfloor I2/w \rfloor$, THEN SKIP LOOP
  WHEN I3<0
    IF $p > \lfloor I1/w \rfloor$ OR $p < \lfloor I2/w \rfloor$, THEN SKIP LOOP ANOTHER METHOD OF REALIZING BLOCK DISTRIBUTION
INSTEAD OF CONDITIONAL EXPRESSIONS:
    $p < \lfloor I1/w \rfloor$   $p = \lfloor I1/w \rfloor$   $p > \lfloor I1/w \rfloor$
EXPRESSIONS:
    $pw < I1$   $pw = I1$   $pw > I1$
MAY BE USED, RESPECTIVELY. SAME GOES
FOR SIGNS OF INEQUALITY $\geq$ AND $\leq$. SAME GOES FOR I2.

FIG.11B

UNEVEN BLOCK DISTRIBUTION

WHEN I3 > 0

$$i1 = \begin{cases} I1 - B(p) & \text{for } B(p) \leq I1 \\ \mod(I1 - B(p), I3) & \text{for } B(p) > I1 \end{cases}$$

$$i2 = \begin{cases} W(p) - 1 & \text{for } B(p+1) \leq I2 \\ I2 - B(p) & \text{for } B(p+1) > I2 \end{cases}$$

$$i3 = I3$$

WHEN I3 < 0

$$i1 = \begin{cases} W(p) - 1 - \mod(B(p+1) - 1 - I1, -I3) & \text{for } B(p+1) \leq I1 \\ I1 - B(p) & \text{for } B(p+1) > I1 \end{cases}$$

$$i2 = \begin{cases} I2 - B(p) & \text{for } B(p) \leq I2 \\ 0 & \text{for } B(p) > I2 \end{cases}$$

$$i3 = I3$$

L(p) MAY BE REPLACED BY myLB

ANOTHER METHOD OF REALIZING UNEVEN BLOCK DISTRIBUTION

WHEN I3 > 0

$$i1 = \begin{cases} W(p) & \text{for } B(p) < I1 \\ I1 - B(p) & \text{for } B(p) = I1 \\ \mod(I1 - B(p), I3) & \text{for } B(p) > I1 \end{cases}$$

$$i2 = \begin{cases} W(p) - 1 & \text{for } B(p) < I2 \\ I2 - B(p) & \text{for } B(p) = I2 \\ -1 & \text{for } B(p) > I2 \end{cases}$$

$$i3 = I3$$

WHEN I3 < 0

$$i1 = \begin{cases} B(p+1) - 1 - \mod(B(p+1) - 1 - I1, -I3) & \text{for } B(p) < I1 \\ I1 - B(p) & \text{for } B(p) = I1 \\ -1 & \text{for } B(p) > I1 \end{cases}$$

$$i2 = \begin{cases} W(p) & \text{for } B(p) < I2 \\ I2 - B(p) & \text{for } B(p) = I2 \\ 0 & \text{for } B(p) > I2 \end{cases}$$

$$i3 = I3$$

ANOTHER METHOD OF REALIZING UNEVEN BLOCK DISTRIBUTION
IT IS ALSO POSSIBLE TO ADD DISCRIMINATION SUCH THAT LOOP IS NOT EXECUTED AS FOLLOWS.
WHEN I3 > 0
    IF B(p) < I1 OR B(p) > I2, THEN SKIP LOOP
WHEN I3 < 0
    IF B(p) > I1 OR B(p) < I2, THEN SKIP LOOP

FIG.11C

CYCLIC DISTRIBUTION
WHEN I3 > 0 t = GCD(P, |I3|) IS DEFINED, AND n IS SET AS INTEGER THAT SATISFIES FOLLOWING CONDITIONS.

$$I1 + n\,I3 \equiv p \pmod{P}$$
$$0 \le n < P/t$$

ALGORITHM TO OBTAIN n IS SHOWN IN Fig. 17.
GCD CAN BE OBTAINED BY ALGORITHM KNOWN AS EUCLIDEAN ALGORITHM.

$$i1 = \begin{cases} (I1 + n\,I3 - p)/P & \text{for } p \equiv I1 \pmod{t} \text{ (WHEN n IS PRESENT)} \\ \text{POSITIVE MAXIMUM NUMBER} & \text{otherwise (WHEN n IS NOT PRESENT)} \end{cases}$$

$$i2 = \lfloor (I2 - p)/P \rfloor$$
$$i3 = I3/t$$

WHEN n IS NOT PRESENT, VALUE OF i1 MAY BE ANY VALUE IF IT IS GREATER THAN i2.

WHEN I3 < 0
n IS OBTAINED IN THE SAME MANNER.

$$i1 = \begin{cases} (I1 + n\,I3 - p)/P & \text{for } p \equiv I1 \pmod{t} \text{ (WHEN n IS PRESENT)} \\ -1 & \text{otherwise (WHEN n IS NOT PRESENT)} \end{cases}$$

$$i2 = \lceil (I2 - p)/P \rceil$$
$$i3 = I3/t$$

WHEN n IS NOT PRESENT, VALUE OF i1 MAY BE ANY VALUE IF IT IS SMALLER THAN i2.

ANOTHER METHOD OF REALIZING CYCLIC DISTRIBUTION
IT IS ALSO POSSIBLE TO ADD DISCRIMINATION SUCH THAT LOOP IS NOT EXECUTED AS FOLLOWS.

WHEN I3 > 0
        IF n IS NOT PRESENT, THEN SKIP LOOP
    WHEN I3 < 0
        IF n IS NOT PRESENT, THEN SKIP LOOP

ANOTHER METHOD OF REALIZING CYCLIC DISTRIBUTION
WHETHER n IS PRESENT MAY BE DETERMINED BY
WHETHER $p \equiv I1 \pmod{t}$, i.e., WHETHER mod(I1-p,t)=0.

FIG.12

| DISTRIBUTION TYPE d | lsize_sup(D) |
|---|---|
| BLOCK DISTRIBUTION | w |
| CYCLIC DISTRIBUTION | $\lceil N/P \rceil$ |
| UNEVEN BLOCK DISTRIBUTION | $\max\{W(q) \mid 0 \leq q < P\}$ |
| BLOCK-CYCLIC DISTRIBUTION | $w \lceil N/(P\,w) \rceil$ |

FIG.13A

```
      real A(0:999,1000)
!hpf$ processors P(0:3)
!hpf$ distribute A(block,*) onto P do J=2,1000
!hpf$    independent, on home(A(I,:))
         do I=0,999
            A(I,J)=A(I,J)+A(I,J-1)
         end do
      end do
      end
```

FIG.13B

```
real a(0:249,1:1000)
CALL mpi_comm_rank(MPI_COMM_WORLD,myID,...)

do j=2,1000
  if (myID.le.0) then
    i1=-250*myID
  else
    i1=0
  endif
  if (myID.lt.3) then
    i2=249
  else
    i2=999-250*myID
  endif
  do i=i1,i2
    a(i,j)=a(i,j)+a(i,j-1)
  end do
end do
end
```

FIG.13C

```
real a(0:249,1:1000)
CALL mpi_comm_rank(MPI_COMM_WORLD,myID,...)

do j=2,1000
  do i=0,249
    a(i,j)=a(i,j)+a(i,j-1)
  end do
end do
end
```

FIG.14A

```
      real A(0:999,1000)
!hpf$ processors P(4)
!hpf$ distribute A(cyclic(5),*) onto P do J=2,1000
!hpf$    independent, on home(A(I,:))
         do I=1,998
            A(I,J)=A(I,J)+A(I,J-1)
         end do
      end do
      end
```

FIG.14B $$i1 = \begin{cases} 5*\lfloor 1/(4*5) \rfloor +5 & = 5 & \text{for } p < 0 \\ 5*\lfloor 1/(4*5) \rfloor +\text{mod}(1,5) & = 1 & \text{for } p = 0 \\ 5*\lfloor 1/(4*5) \rfloor & = 0 & \text{for } p > 0 \end{cases}$$

$$i2 = \begin{cases} 5*\lfloor 998/(4*5) \rfloor +5-1 & = 249 & \text{for } p < 3 \\ 5*\lfloor 998/(4*5) \rfloor +\text{mod}(998,5) & = 248 & \text{for } p = 3 \\ 5*\lfloor 998/(4*5) \rfloor -1 & = 244 & \text{for } p > 3 \end{cases}$$

FIG.14C

```
real a(0:249,1:1000)
CALL mpi_comm_rank(MPI_COMM_WORLD,myID,...)

do j=2,1000
  if (myID.eq.0) then
    i1=1
  else
    i1=0
  endif
  if (myID.lt.3) then
    i2=249
  else
    i2=248
  endif
  do i=i1,i2
    a(i,j)=a(i,j)+a(i,j-1)
  end do
end do
end
```

FIG.15A

```
      real A(0:11,0:999)
      integer,parameter ::
    & MAP(12)=(/2,1,3,4,3,2,4,4,1,2,2,4/)
!hpf$ processors P(4)
!hpf$ distribute A(indirect(MAP),*) onto P do J=1,1000
!hpf$    independent, on home(A(I,:))
         do I=M,N
           A(I,J)=A(I,J)+A(I,J-1)*I
         end do
      end do
      end
```

FIG.15B

```
      real a(0:11,0:999)
      integer,parameter ::
    & MAP(12)=(/2,1,3,4,3,2,4,4,1,2,2,4/)
      integer mapArray(0:11), gtol(0:12), ltog(0:11)
!--- INITIALIZATION
      CALL mpi_comm_rank(MPI_COMM_WORLD,myID,...)
      do I=0,11
        mapArray(I)=MAP(I-1)-1
      end do
      gtol(0) = 0
      i = 0
      do k=0,11
        if (myID.EQ.mapArray(k)) then
          ltog(i) = k
          i = i+1
        end if
        gtol(k+1) = i
      end do !--- EXECUTION
      do j=1,1000
        do i=gtol(M),gtol(N+1)-1
          a(i,j) = a(i,j)+ltog(i)*a(i,j-1)
        end do
      end do
      end
      end
```

FIG.16A

```
        real X(100,100,0:23)
!hpf$ processors Q(0:5)
!hpf$ distribute X(*,*,cyclic) onto Q !hpf$ independent, on home(X(:,:,k))
        do k=4,20,4
          do j=1,100
            do i=1,100
              X(i,j,k)=i*j*k
            end do
          end do
        end do
        end
```

FIG.16B

```
    REAL x(1:100,1:100,0:3)                              ——— STEP S300
    INTEGER i,j,k
    INTEGER myID                                         ——— STEP S100
    INTEGER k1,k2,k3                                     ——— STEP S210
    INTEGER n_cyc
                                                         ——— STEP S210
    INTEGER,EXTERNAL:: cyclic_f
    CALL mpi_comm_rank(MPI_COMM_WORLD,myID,...)          ——— STEP S100
    n_cyc = cyclic_f(4,4,6,myID,2)                       ——— STEP S210
    IF (n_cyc.NE.-1) THEN                                ——— STEP S210
       k1 = (4+n_cyc*4-myID)/6  ⎤
       k2 = (26-myID)/6-1       ⎬ STEP S210
       k3 = 2                   ⎥
       DO k=k1,k2,k3            ⎦
         DO j=1,100,1
           DO i=1,100,1
             x(i,j,k) = i*j*(6*k+myID)                   ——— STEP S220
           ENDDO
         ENDDO
       ENDDO
    ENDIF
    END INTEGER FUNCTION cyclic_f(i1,i3,P,myID,t)  ⎤
    INTEGER i1,i3,P,myID,t                     ⎥
    INTEGER j,n,n_max                          ⎥
    j = 0                                      ⎥
    n = -1                                     ⎥
    n_max = P/t                                ⎥
2000 CONTINUE                                  ⎥
    IF (mod(i1+i3*j,P).EQ.myID) THEN           ⎬ STEP S210
       n = j                                   ⎥
    ELSE                                       ⎥
       j = j+1                                 ⎥
       IF (j.LT.n_max) GOTO 2000               ⎥
    ENDIF                                      ⎥
    cyclic_f = n                               ⎥
    END FUNCTION                               ⎦
```

FIG.18A

```
1  !hpf$ processors P(0:3),P2(0:1,0:1)
2        real A(0:29),B(0:29,0:29),C(0:29),D(0:9,0:9),R(0:9,0:9)
3  !hpf$ template T1(0:29),T2(0:29,0:29)
4  !hpf$ distribute T1(block(8)) onto P
5  !hpf$ distribute T2(block(5),block(5)) onto P2
6  !hpf$ align A(:)   with T1(:)
7  !hpf$ align B(*,:) with T1(:)
8  !hpf$ align C(:)   with T1(:)
9  !hpf$ align D(:,:) with T2(:,:)
10
11 !hpf$ independent, new(j)
12       L1: do i=1,28
13 !hpf$    on home(T1(i))
14          A(i)=B(i,i)+C(i)
15          do j=1,10
16             B(j,i)=0.1*i*j
17          end do
18       end do
19
20 !hpf$ independent, new(i)
21       L3: do j=1,9,2
22 !hpf$    on home(T2(:,j))
23 !hpf$    independent
24          L2: do i=0,j
25 !hpf$       on home(T2(i,j))
26             D(i,j)=R(i,j)
27          end do
28       end do
29
30       end
```

FIG.18D

```
1  !hpf$  processors P2(0:1,0:1)                         STEP S300
2         real A(0:7),B(0:29,0:7),C(0:7),D(0:9,0:9),R(0:9,0:9)
3  !hpf$  template T2(0:29,0:29)
5  !hpf$  distribute T2(block(5),block(5)) onto P2       STEP S100,
9  !hpf$  align D(:,:) with T2(:,:)                      STEP S210
          integer myID1,myLB1,ib1,ie1
10
          CALL mpi_comm_rank(MPI_COMM_WORLD,RANK,ierr)  ⎫
          myID1=RANK                                     ⎬ STEP S210
          myLB1=8*myID1                                  ⎭ if (myID1.le.0) then      ⎫
             ib1=1-myLB1            ⎪
          else                      ⎪
             ib1=0                  ⎪
          endif                     ⎬ STEP S210
          if (myID1.lt.3) then      ⎪
             ie1=7                  ⎪
          else                      ⎪
             ie1=28-myLB1           ⎪
          endif                     ⎭
12        L1: do i=ib1,ie1
14           A(i)=B(i+myLB1,i)+C(i)
15           do j=1,10                     STEP S220
16             B(j,i)=0.1*(i+myLB1)*j
17           end do
18        end do
19
20 !hpf$  independent, new(i)
21        L3: do j=1,9,2
22 !hpf$    on home(T2(:,j))
23 !hpf$    independent
24          L2: do i=0,j
25 !hpf$      on home(T2(i,j))
26             D(i,j)=R(i,j)
27           end do
28        end do
29
30        end
```

FIG.18E

| PROCESSOR DEFINED BY USER | PROCESSOR NUMBER p1 | PROCESSOR NUMBER p2 | RANK OF MPI |
|---|---|---|---|
| P2(0,0) | 0 | 0 | 0 |
| P2(1,0) | 1 | 0 | 1 |
| P2(0,1) | 0 | 1 | 2 |
| P2(1,1) | 1 | 1 | 3 |

FIG.18F $$ib2 = \begin{cases} 0-myLB2 & \text{for } myID2 \leqq 0 \\ 0 & \text{for } myID2 > 0 \end{cases}$$

$$ie2 = \begin{cases} 4 & \text{for } myID2 < 1 \\ j-myLB2 & \text{for } myID2 \geqq 1 \end{cases}$$

FIG.18G $$ib3 = \begin{cases} 1-myLB3 & \text{for } myID3 \leqq 0 \\ modulo(1-myLB3,2) & \text{for } myID3 > 0 \end{cases}$$

$$ie3 = \begin{cases} 4 & \text{for } myID3 < 1 \\ 9-myLB3 & \text{for } myID3 \geqq 1 \end{cases}$$

```
 2      real A(0:7),B(0:29,0:7),C(0:7),D(0:4,0:4),R(0:9,0:9)      ── STEP S300
        integer myID1,myLB1,ib1,ie1
        integer myID2,myLB2, myID3,myLB3      ─────── STEP S100
        integer ie2,ib3,ie3 ──────── STEP S210
10
        CALL mpi_comm_rank(MPI_COMM_WORLD,RANK,ierr)
        myID1=RANK
        myLB1=8*myID1
        myID2=MOD(RANK,2)     ⎫
        myID3=RANK/2          ⎬ STEP S100
        myLB2=5*myID2         ⎪
        myLB3=5*myID3         ⎭ if (myID1.le.0) then ; ib1=1-myLB1
        else                 ; ib1=0
        endif
        if (myID1.lt.3) then ; ie1=7
        else                 ; ie1=28-myLB1
        endif
12      L1: do i=ib1,ie1
14        A(i)=B(i+myLB1,i)+C(i)
15        do j=1,10
16          B(j,i)=0.1*(i+myLB1)*j
17        end do
18      end do
19
        if (myID3.le.0) then               ⎫
           ib3=1-myLB3                     ⎪
        else                               ⎪
           ib3=MODULO(1-myLB3,2)           ⎪
        endif                              ⎬ STEP S210 FOR L3
        if (myID3.lt.1) then               ⎪
           ie3=4                           ⎪
        else                               ⎪
           ie3=9-myLB3                     ⎪
        endif                              ⎭
21      L3: do j=ib3,ie3,2                 ⎫
           if (myID2.lt.1) then            ⎪
              ie2=4                        ⎪
           else                            ⎬ STEP S210 FOR L2
              ie2=j-myLB2                  ⎪
           endif                           ⎪
24         L2: do i=0,ie2                  ⎭
26            D(i,j)=R(i+myLB2,j+myLB3)
27         end do
28      end do
29                          STEP S220    STEP S220
30      end                 FOR L2       FOR L3
```

FIG.23A

```
      real A(1000,1000)

do J=2,1000
        do I=1,1000
          A(I,J)=A(I,J)+A(I,J-1)
        end do
      end do
      end
```

FIG.23B

```
      real A(1000,1000)

do J=2,1000
!$omp    parallel do
        do I=1,1000
          A(I,J)=A(I,J)+A(I,J-1)
        end do
      end do
      end
```

FIG.23C

```
      real A(1000,1000)
!hpf$ processors P(0:3)
!hpf$ distribute A(block,*) onto P do J=2,1000
!hpf$    independent
        do I=1,1000
          A(I,J)=A(I,J)+A(I,J-1)
        end do
      end do
      end
```

FIG.24B

```
real a(1:250,1:1000)    ! CODE IN SIZE AFTER BEING DIVIDED IS
                          ALLOCATED TO EACH PROCESSOR myLB=250*myID+1         ! LOWER BOUND OF RANGE WHICH EACH
                          PROCESSOR TAKES CHARGE OF myUB=myLB+249           ! DITTO, UPPER BOUND do j=1,1000
   do I=myLB,myUB
      a(I-myLB+1,j)=a(I-myLB+1,j)+a(I-myLB+1,j-1)
   end do
end do
end
```

FIG.25A

```
        real A(1:1000,1:1000)
!hpf$ processors P(4)
!hpf$ distribute A(cyclic(5),*) onto P    ! BLOCK-CYCLIC DISTRIBUTION
        do J=1,1000                        WITH WIDTH OF 5
!hpf$   independent
          do I=2,999                       !UNMATCHED WITH ARRAY
            A(I,J)=A(I,J)+A(I,J-1)         SHAPE
          end do
        end do
        end
```

FIG.25B

| PROC-ESSOR | p | LOCAL INDEX | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | ... | 246 | 247 | 248 | 249 | 250 |
| P(0) | 0 | 1 | 2 | 3 | 4 | 5 | 21 | 22 | 23 | 24 | 25 | 41 | ... | 981 | 982 | 983 | 984 | 985 |
| P(1) | 1 | 6 | 7 | 8 | 9 | 10 | 26 | 27 | 28 | 29 | 30 | 46 | ... | 986 | 987 | 988 | 989 | 990 |
| P(2) | 2 | 11 | 12 | 13 | 14 | 15 | 31 | 32 | 33 | 34 | 35 | 51 | ... | 991 | 992 | 993 | 994 | 995 |
| P(3) | 3 | 16 | 17 | 18 | 19 | 20 | 36 | 37 | 38 | 39 | 40 | 56 | ... | 996 | 997 | 998 | 999 | 1000 |

FIG.25C

```
real a(1:250,1:1000)          ! CODE IS COMPRESSED BY SIZE AFTER
                                BEING DIVIDED AND ALLOCATED myLB1=5*myID+1                ! LOWER BOUND OF INITIAL BLOCK
                                IN EACH PROCESSOR myUB1=myLB1+980               ! LOWER BOUND OF END BLOCK IN EACH
                                PROCESSOR
mySP1=20                      ! DISTANCE BETWEEN BLOCKS
myLB2=0
IF(myID.eq.0) myLB2=1         ! WITH CONSIDERATION OF SHIFT OF
myUB2=4                         LOOP INITIAL VALUE
IF(myID.eq.3) myUB2=3         ! WITH CONSIDERATION OF SHIFT OF
                                LOOP END VALUE
   do j=1,1000
      do I1=myLB1,myUB1,myST1
         do I=I1+myLB2,I1+myUB2
            a((I-1)/20*5+MODULO(I-1,5)+1,j)=
&              a((I-1)/20*5+MODULO(I-1,5)+1,j)+
&              a((I-1)/20*5+MODULO(I-1,5)+1,j-1)
         end do
      end do
   end do
end
```

FIG.26A

```
      real A(0:11,0:999)
      integer,parameter ::
    & MAP(12)=(/2,1,3,4,3,2,4,4,1,2,2,4/)
!hpf$ processors P(4)
!hpf$ distribute A(indirect(MAP),*) onto P   ! DISTRIBUTION
                                               EXPRESSED BY
                                             ! CORRESPONDING
      do J=1,1000                              TABLE MAP
!hpf$   independent
        do I=M,N
          A(I,J)=A(I,J)+I*A(I,J-1)
        end do
      end do
      end
```

FIG.26B

| PROC-<br>ESSOR | p | LOCAL INDEX | | | |
|---|---|---|---|---|---|
| | | 1 | 2 | 3 | 4 |
| P(0) | 0 | 2 | 9 | | |
| P(1) | 1 | 1 | 6 | 10 | 11 |
| P(2) | 2 | 3 | 5 | | |
| P(3) | 3 | 4 | 7 | 8 | 12 |

FIG.26C

```
    real A(0:11,0:999)
    integer,parameter ::
 &  MAP(1:12) =(/2,1,3,4,3,2,4,4,1,2,2,4/)
    integer GTOL(1:12),icount(4)
!--- INITIALIZATION
    do id=1,4
       icount(id)=0
    end do
    do I=1,12
       icount(MAP(I)) = icount(MAP(I))+1
       GTOL(I) = icount(MAP(I))
    end do !--- EXECUTION
    do j=1,1000
       do I=M,N
          if (myID.eq.MAP(I)) then
             A(GTOL(I),j)=A(GTOL(I),j)+I*A(GTOL(I),j-1)
          endif
       end do
    end do
    end
```

FIG.27

| ⌈x⌉ | MINIMUM INTEGER (ceiling FUNCTION) NOT SMALLER THAN x |
| --- | --- |
| ⌊x⌋ | MAXIMUM INTEGER (floor FUNCTION) NOT GREATER THAN x |
| mod(x, y) | REMAINDER FUNCTION mod(x,y)=x−⌊x/y⌋y FOR EXAMPLE mod(8,5)=3, mod(−8,5)=2 |
| GCD(x, y) | LEAST COMMON MULTIPLE BETWEEN x AND y |
| \|x\| | ABSOLUTE VALUE OF x |

PROGRAM AND APPARATUS FOR TRANSLATING LANGUAGE, AND PROGRAM CONVERTING METHOD

BACKGROUND OF THE INVENTION

1) Field of the Invention

The present invention relates to a translator program, a program converting method, and a translator device for analyzing a parallel language program and converting the parallel language program to a sequential language program that is subjected to distributed processing by a plurality of processors. More particularly, the present invention relates to a translator program, a program converting method, and a translator device capable of preventing reduction in execution efficiency of a loop due to calculation of a loop index.

2) Description of the Related Art

Parallelism of scientific and engineering calculations is carried out based on distributed processing of data and distributed processing Of a loop. In the former, the data is allocated to a plurality of processors, each of which performs processing on each data allocated. In the latter, the loop is allocated to a plurality of processors, each of which performs processing on each loop allocated. FIG. 21A is a diagram for explaining distribution of data, and FIG. 21B is a diagram for explaining distribution of a loop.

As shown in FIG. 21A, a one-dimensional array A consisting of 30 elements of data is divided into four blocks that consist of eight elements of data, eight elements of data, eight elements of data, and six elements of data, respectively. Four processors perform distributed processing on the four blocks. As shown in FIG. 21B, a process of 30 repetitions for a loop variable 1 is divided into four blocks that consist of eight repetitions, eight repetitions, eight repetitions, and six repetitions, respectively. Four processors perform distributed processing on the four blocks.

As explained above, in the scientific and engineering calculation, the distributed processing performed on the data and the loop allows high speed of processing. It is noted that division of the data and division of the loop are integrally handled as division of an index.

In a parallel programming language such as High Performance Fortran (HPF), OpenMP, and VPP Fortran, division of an index can be specified. More specifically, VPP Fortran has a format for expressing data division and loop division. HPF has a format for expressing the data division and can indirectly express the loop division. OpenMP has a format for expressing the loop division but does not have a format for expressing the data division because this language is targeted for a shared memory computer.

These parallel programming languages provide a plurality of types of index divisions. FIG. 22 is a schematic diagram for explaining types of distribution based on the index divisions, in which 30 elements are divided into four blocks. As shown in this figure, the distribution based on the index divisions includes five types as follows: block distribution, cyclic distribution, block-cyclic distribution, uneven block distribution, and irregular distribution.

Details of the respective distributions are as follows. The block distribution is suitable for an application in which there is a close correspondence between adjacent pieces of data (array elements) because data continuity remains in each dimension distributed. If calculation load is uneven on calculation ranges, or if the capabilities of parallel computers are nonuniform (hetero environment), the uneven block distribution may be used instead of the block distribution, which allows load balance to be adjusted.

If the load balance or the calculation range is different in each execution loop or is undefined until execution, then the cyclic distribution may be used, which allows the load distribution to be made almost even. In the cyclic distribution, however, if there is a close correspondence between adjacent pieces of data, communications frequently occur. In this case, the block-cyclic distribution is used as an intermediate method between the block distribution and the cyclic distribution.

If a correspondence between data and processors is irregular like in a case where particles floating in space are calculated and the correspondence needs to be controlled by a table, then the irregular distribution can be used.

FIG. 23A to FIG. 23C are diagrams for explaining parallelism based on a parallel programming language. FIG. 23A is an example of a sequential program, FIG. 23B is an example of parallelism based on OpenMP, and FIG. 23C is an example of parallelism (input example 1) based on HPF.

As shown in FIG. 23B, a "parallel do" directive on line 4 directs so as to parallelize a loop "do 1". Since OpenMP is based on sharing of data, there is no directive for division and arrangement of data.

As shown in FIG. 23C, line 2 and line 3 direct that a variable A in the first-dimensional direction is evenly divided into four blocks and the four blocks are arranged in four processors. An "independent" directive on line 6 directs that the loop do 1 can be parallelized.

To parallelize the loop, it is necessary to decide a range of a loop index to be executed by each processor. In OpenMP, how to divide the loop is decided in language specification, and the range of the index is mechanically divided. In HPF, a compiler automatically decides how to divide the loop so as to match, as much as possible, with division and arrangement of a variable (A in this example) that is accessed in the loop.

As explained above, the compiler generates code with which a plurality of processors can actually parallelize a program parallelized. At this time, the compiler divides the index ranges of the data and the loop, and allocates the index ranges divided to the processors. By converting indexing of the data, a declaration type is made identical among the processors, which allows static data allocation using a Single Program/Multiple Data (SPMD) system.

FIG. 24A is a diagram for explaining a correspondence between divided indexes of the data or the loop and each processor. In an array a (i, j) of 1000×1000, data from line 1 to line 250 is allocated to a zero-th processor P(0), data from line 251 to line 500 is allocated to a first processor P(1), data from line 501 to line 750 is allocated to a second processor P(2), and data from line 751 to line 1000 is allocated to a third processor P(3).

FIG. 24B is a diagram of code output by a conventional compiler for the parallel language program shown in FIG. 23C. As shown in FIG. 24B, myID is a processor number, and by using the myID, a lower dimension bound (hereinafter, "lower bound") myLB and an upper dimension bound (hereinafter, "upper bound") myUB of an index range which each processor takes charge of are calculated. The lower bound and the upper bound are used to specify a repetition range and make an access to data.

If an access is made to data a (i, j), i=gtol(I)=I−myLB+1=I−250*myID is required when the access is executed. Specifically, this program indicates conversion from a global index I that is an index of an input program before conversion to a local index i that is an index of a program after the conversion.

The conversion "gtol" becomes a different function depending on a distribution type or a parameter (the length of an index or the number of divisions) and becomes a complex computational expression depending on the distribution type. Therefore, the "gtol" is often realized by calling an execution-time library. In the case of irregular distribution, the "gtol" cannot be expressed only by one expression, and therefore, a table is used for reference.

Such a technology is disclosed in Non-patent literatures as follows:

Non patent literature 1: High Performance Fortran Forum: "High Performance Fortran Language Specification Version 2.0.", 1997;

Non-patent literature 2: "High Performance Fortran 2.0 Official Manual", Springer-Verlag Tokyo, 1999 (ISBN4-431-70822-7) (translation by Fujitsu Ltd., Hitachi Ltd., and NEC Corp.);

Non-patent literature 3: Japan Association for High Performance Fortran (JAHPF): "HPF/JA Language Specification Version 1.0", November 1999, searched on Jun. 18, 2004, Internet<URL: HYPERLINK http://www.hpfpc.org/jahpf/spec/hpfja-v10-eng.pdf http://www.hpfpc.org/jahpf/spec/hpfja-v10-eng.pdf>;

Non-patent literature 4: OpenMP Architecture Review Board, "OpenMP Fortran Application Program Interface Version 2.0", November, 2000, searched on Jun. 18, 2004, Internet<URL: HYPERLINK http://www.openmp.org/specs/mp-documents/fspec20.pdf http://www.openmp.org/specs/mp-documents/fspec20.pdf>; and Non-patent literature 5: OpenMP Architecture Review Board, "OpenMP C/C++ Application Program Interface Version 1.0", October, 1998, searched on Jun. 18, 2004, Internet<URL:HYPERLINK http://www.openmp.org/specs/mp-documents/cspec10.pdfhttp://www.openmp.org/specs/mp-documents/cspec10.pdf>.

In the code as shown in FIG. 24B, the conversion gtol from the global index I to the local index i is comparatively simple. However, even in this case, the cost of index conversion (execution of numeral operations) is quite high as compared with the cost (for about one time of "load" command) of variable access when the index conversion is not performed. Therefore, the execution time required for this part may be increased to several times the execution time.

A more generic case includes a case of distribution other than block distribution, a case of a mismatch between an initial value or a final value of the loop and a declaration type of an array, a case of an increment other than 1 in the loop, and a case where the size of an index cannot be divided by the number of processors. In the more generic case, the parallelized loop results in more complex one, which causes execution efficiency to be reduced.

For example, FIG. 25A is a diagram for explaining a parallel language program in which block-cyclic distribution is used. In this example, the upper and lower bounds of a loop are different from those of an array. In this case, a correspondence between global indexes and local indexes are shown in FIG. 25B.

As shown in FIG. 25B, in the processor P(0), global indexes "1-5" correspond to local indexes "1-5", global indexes "21-25" correspond to local indexes "6-10", and global indexes "981-985" correspond to local indexes "246-250".

FIG. 25C is a table of conventional code generated for the parallel language program shown in FIG. 25A. As shown in FIG. 25C, an index conversion expression is (I−1)/20*5+MOD(I−1,5)+1 (the division is integer division in which the remainder is rounded down). As for the parallel loop, the range to be executed by each processor turns into a discontinuous range in which five elements are made one block.

Therefore, the range cannot be expressed using a single DO loop, and a complex double loop is used. The complexity of output code is likely to cause reduction in execution efficiency.

FIG. 26A is a diagram for explaining a parallel language program in which irregular distribution is used as another example of distribution. In this case, a correspondence between global indexes and local indexes is as shown in FIG. 26B.

FIG. 26C is a diagram of a conventional code generated for the parallel language program shown in FIG. 26A. In this code, index conversion cannot be expressed by an expression, and therefore, a table GTOL generated by the compiler is used for reference.

Since a value of a loop index executed in each processor cannot be expressed by a DO statement of Fortran, an IF statement is used to select repetition to be executed. In other words, there occurs such waste that all the loop ranges are executed by all the processors. The amount of waste becomes relatively larger when the number of processors is increased.

SUMMARY OF THE INVENTION

It is an object of the present invention to solve at least the problems in the conventional technology.

A translator program according to one aspect of the present invention makes a computer execute generating a setting code for setting a value in a distribution parameter; and generating a localizing code for localizing a loop index and an array index based on the distribution parameter of which the value is set by the setting code generated.

A computer-readable recording medium according to another aspect of the present invention stores a translator program according to the above aspect.

A program converting method according to still another aspect of the present invention includes generating a setting code for setting a value in a distribution parameter; and generating a localizing code for localizing a loop index and an array index based on the distribution parameter of which the value is set by the setting code generated.

A translator apparatus according to still another aspect of the present invention includes a parameter generating unit that generates a setting code for setting a value in a distribution parameter; and an index localizing unit that generates a localizing code for localizing a loop index and an array index based on the distribution parameter of which the value is set by the setting code generated.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1A is a schematic of an example of parallelism based on program conversion according to an embodiment of the present invention;

FIG. 1B is a schematic of another example of the parallelism based on the program conversion according to the embodiment of the present invention;

FIG. 1C is a schematic of still another example of the parallelism based on the program conversion according to the embodiment of the present invention;

FIG. 3 is a schematic of a recursion formula with which a local index is obtained from a global index;

FIG. 4A is a schematic of code generated by a loop-parameter localizing unit;

FIG. 4B is a schematic of code generated by the loop-parameter localizing unit when an increment is not present in a loop parameter;

FIG. 4C is a schematic of code generated by the loop-parameter localizing unit when irregular distribution is performed;

FIG. 5 is a schematic of loop conversion for eliminating an increment;

FIG. 6 is a flow diagram of a process of a code generator;

FIG. 7 is a table of attributes of distribution D;

FIG. 8 is a table of definition of gtol;

FIG. 9 is a table of definition of ltog;

FIG. 10A is a table (1) of definition of gtol 2;

FIG. 10B is a table (2) of definition of gtol 2;

FIG. 11A is a table (1) of definition of gtol 3;

FIG. 11B is a table (2) of definition of gtol 3;

FIG. 11C is a table (3) of definition of gtol 3;

FIG. 12 is a table of definition of L_size_sup;

FIG. 13A is a schematic of internal expression input by the code generator for an input example 1 as shown in FIG. 23C;

FIG. 13B is a schematic of a program after the input example 1 is converted;

FIG. 13C is a program after general-purpose optimization is performed;

FIG. 14A is a schematic of internal expression input by the code generator for an input example 2 as shown in FIG. 25A;

FIG. 14B is a schematic of expressions for calculating an initial value i1 and a final value i2;

FIG. 14C is a schematic of a program after the input example is converted;

FIG. 15A is a schematic of internal expression input by the code generator for an input example 3 as shown in FIG. 26A;

FIG. 15B is schematic of a program after the input example 3 is converted;

FIG. 16A is a schematic of internal expression input by the code generator for an input example 4;

FIG. 16B is a program after the input example 4 is converted;

FIG. 18A is a schematic of internal expression input by the code generator for an input example 5;

FIG. 18D is a schematic of result of conversion in progress;

FIG. 18E is a table of correspondence between a multi-dimensional processor group and processors;

FIG. 18F is a schematic of loop parameters;

FIG. 18G is a schematic of loop parameters;

FIG. 18H is a schematic of a program after the input example 5 is converted;

FIG. 23A is a schematic of a sequential program;

FIG. 23B is a schematic of code for parallelism based on OpenMP;

FIG. 23C is a schematic of code for parallelism (input example 1) based on HPF;

FIG. 24B is a schematic of code output by the conventional compiler for the parallel language program shown in FIG. 23C;

FIG. 25A is a schematic of a parallel language program in which block-cyclic distribution is used;

FIG. 25B is a schematic of a correspondence between global indexes and local indexes;

FIG. 25C is a schematic of conventional code generated for the parallel language program shown in FIG. 25A;

FIG. 26A is a schematic of a parallel language program in which irregular distribution is used;

FIG. 26B is a table of a correspondence between global indexes and local indexes;

FIG. 26C is a schematic of conventional code generated for the parallel language program shown in FIG. 26A; and FIG. 27 is a schematic of mathematical symbols.

DETAILED DESCRIPTION

Exemplary embodiments of a translator program, a program converting method, and a translator device according to the present invention are explained in detail below with reference to the accompanying drawings. In the embodiments, the case where the present invention is used in a parallel language program that is generated using HPF is mainly explained. It is noted that mathematical symbols are defined as shown in FIG. 27 and terms for use herein are defined as follows.

Symmetric Multiprocessor (SMP):

Parallel execution during which a plurality of central processing units (CPUS) share the same memory space. It is not necessary to think of data distribution, and all the data can directly be accessed from all the CPUs. In general, a shared memory computer can be an SMP type computer.

Single Program/Multiple Data (SPMD):

Method of providing the same program to a plurality of processors, causing them to share the process according to parameters such as different processor identification (ID), and causing them to perform parallel execution as a whole.

Identity alignment:

Alignment of m=1 and n=0

Alignment:

Alignment of the d-th dimension of A to the e-th dimension of B indicates that an index i in the d-th dimension of A corresponds to an index j in the e-th dimension of B, and that array elements corresponding to each other are distributed to the same processor. The alignment defined in HPF is as follows:

$$j = mi + n \ (m, n: \text{integer}, m \neq 0)$$

and an ALIGN directive is used to express the alignment as follows.

$$\text{ALIGN } A(i) \text{ WITH } B(m*i+n)$$

In HPF, alignment from array data to array data or to a template can be expressed by the ALIGN directive. By an ON directive, alignment from a loop to array data or to a template can be indirectly expressed. In VPP Fortran, alignment from array data to a template and from a loop to a template can be expressed. OpenMP does not have the expression of alignment, but it may be assumed that there is always an identity alignment (alignment of m=1, n=0) from a parallel loop to a template.

Figure 22:
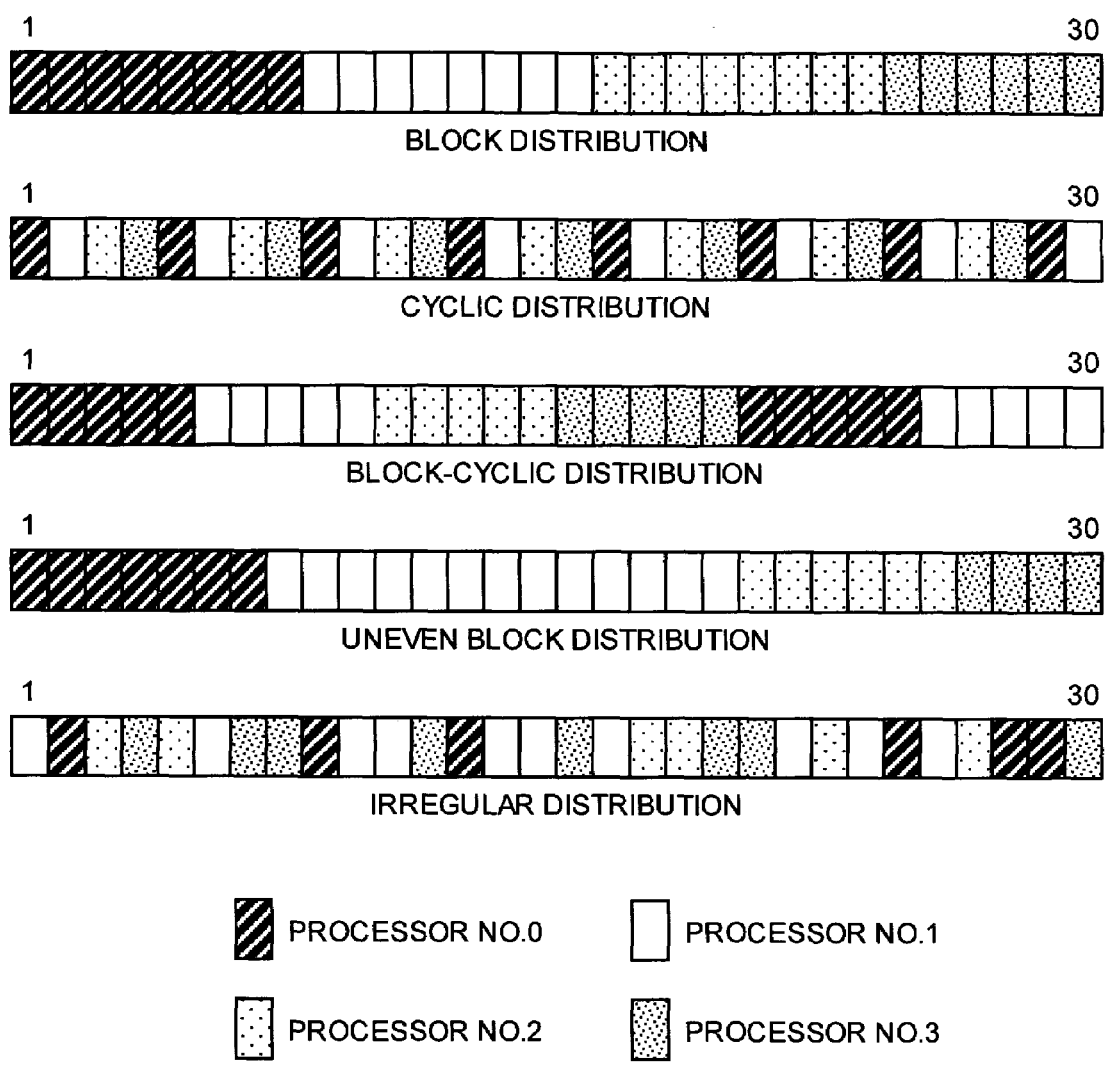
FIG. 22 is a schematic of types of distributions by index division.

Template:

Virtual array that serves as an intermediate when array elements and repetitions of a loop are distributed to processors. The template is defined in HPF language specification (see Non-patent literatures 1 and 2), and is similar to the concept of index in VPP Fortran (see Non-patent literature 5). The templates are correlated to processors in a method of distribution as shown in the examples of FIG. 22. A variable and a loop can be aligned to the template.

Processor:

Virtual unit used to execute parallel calculation. Processors can be arranged in an arbitrary dimensional rectangle. The total number of processors expresses parallelism. In a distributed memory computer, each processor has a specific memory space. In the shared memory computer (SMP), the memory space is shared among the processors. A correspondence between a processor and a physical CPU may be defined in the language specification, or may be decided by a compiler or an operating system. Execution by the processors may also be accomplished physically by a single CPU. When a plurality of processor arrays are defined, a correspondence between the array elements may be defined in the language specification, or may be decided by the compiler or the operating system.

Local Access:

Access to data without performance of communications between processors. When the data is to be referred to, a processor that makes an access thereto needs to possess the data. When the data is to be defined, in addition to the possession, all the processors that have copied data need to define the same value for the data. If a variable is not distributed, i.e., a variable is not distributed to the processors but a copy of all the elements is arranged in the processors, the process of reference is performed based on the local access, but the process of definition is performed not based on the local access in the DO loop distributed.

Parameters for characterizing distribution together with a distribution type include as follows.

Nd: Extent of a dimension d of a template. In other words, the length of an index to be divided. For example, in the HPF program, if !HPF$ PROCESSORS Q(4,6)
!HPF$ TEMPLATE U(100, 0:29)
!HPF$ DISTRIBUTE U(block, cyclic) ONTO Q, then N1=100 and N2=30. In this case, N may also be written simply without "d".

Pd: Extent of a dimension of a processor group corresponding to the dimension d of the template. In other words, the number of divisions of an index. When the processor group as a target to which data is distributed is a one-dimensional array, P1 is the number of processors that form the processor group. For example, P1=4 and P2=6 in the example. Assume herein that the d-th dimension of the template is normalized so as to correspond to the d-th dimension of the processor group. In this case, P may also be written simply without "d".

pd: Position ($0 \leq pd < Pd$) of a local processor in the dimension of the processor group corresponding to the dimension d of the template. For example, processors Q(1,3) in the example indicate p1=1 and p2=3. The value of pd can be calculated from a virtual processor number obtained by calling a library upon execution. In this case, p may also be written simply without "d".

w: Width of a block when block distribution or block-cyclic distribution is selected. If the block distribution is selected and no specification is made by user, in HPF and OpenMP, the following is defined.

$$w = [N/P] \quad (1)$$

W: Array with a block width (hereinafter, "block-width array") when uneven block distribution is selected. Vector of length P. W(p) ($0 \leq p < P$) is a width of an index allocated to a processor p. When W(0)=W(1)= . . . =W(P−1)=w, W indicates block distribution with the width w.

M: Mapping array normalized when irregular distribution is selected. Vector of length Nd. M(k) ($0 \leq k < N$) indicates an element number of a processor corresponding to each element of a template, and $0 \leq M(k) < P$.

The following is a parameter derived from the parameters.

B: Array indicating a lower bound in a global index when uneven block distribution is selected. Vector of length P. The array is defined as follows.

$$B(p) = \sum_{k=0}^{p-1} W(k) \quad (2)$$

Hereinafter, these parameters are totally called distribution parameters.

Although there are many processes for generating an expression in each procedure, it is desired to generate the expression as simple as possible by using evaluation of a constant and expression manipulation technique, or to make the expression as simple as possible after the code is generated using an optimization technology such as constant propagation and convolution.

FIG. 1A is an example (1) of parallelism based on program conversion according to an embodiment of the present invention. In this example, the parallel language program (input example 1) as shown in FIG. 23C is parallelized.

As shown in FIG. 1A, in the program conversion according to the embodiment, by localizing indexes not only in array data but also in a loop, code as follows is generated. The code does not require conversion of a subscript expression at all in local access within the loop of distributed array. Specifically, if an access is made to an array a, code for accessing is generated using the local index i.

FIG. 1B is an example (2) of parallelism based on the program conversion according to the embodiment of the present invention. In this example, the parallel language program (input example 2) as shown in FIG. 25A is parallelized. As shown in FIG. 1B, even if block-cyclic distribution is used and the upper and lower bounds of a loop are different from those of an array, code not requiring conversion of a subscript expression is generated without using a complex index conversion expression or a double loop which is used in the conventional parallelism as shown in FIG. 25C.

FIG. 1C is an example (3) of parallelism based on the program conversion according to the embodiment of the present invention. In this example, the parallel language program (input example 3) as shown in FIG. 26A is parallelized. As shown in FIG. 1C, even if irregular distribution is used, code not requiring conversion of a subscript expression is generated without referring to a table GTOL as shown in the conventional parallelism of FIG. 26C.

As explained above, in the program conversion according to the embodiment, it is possible to prevent reduction in execution efficiency of the loop caused by calculation of the loop index by localizing the index in not only the array data but also in the loop.

Figure 2:
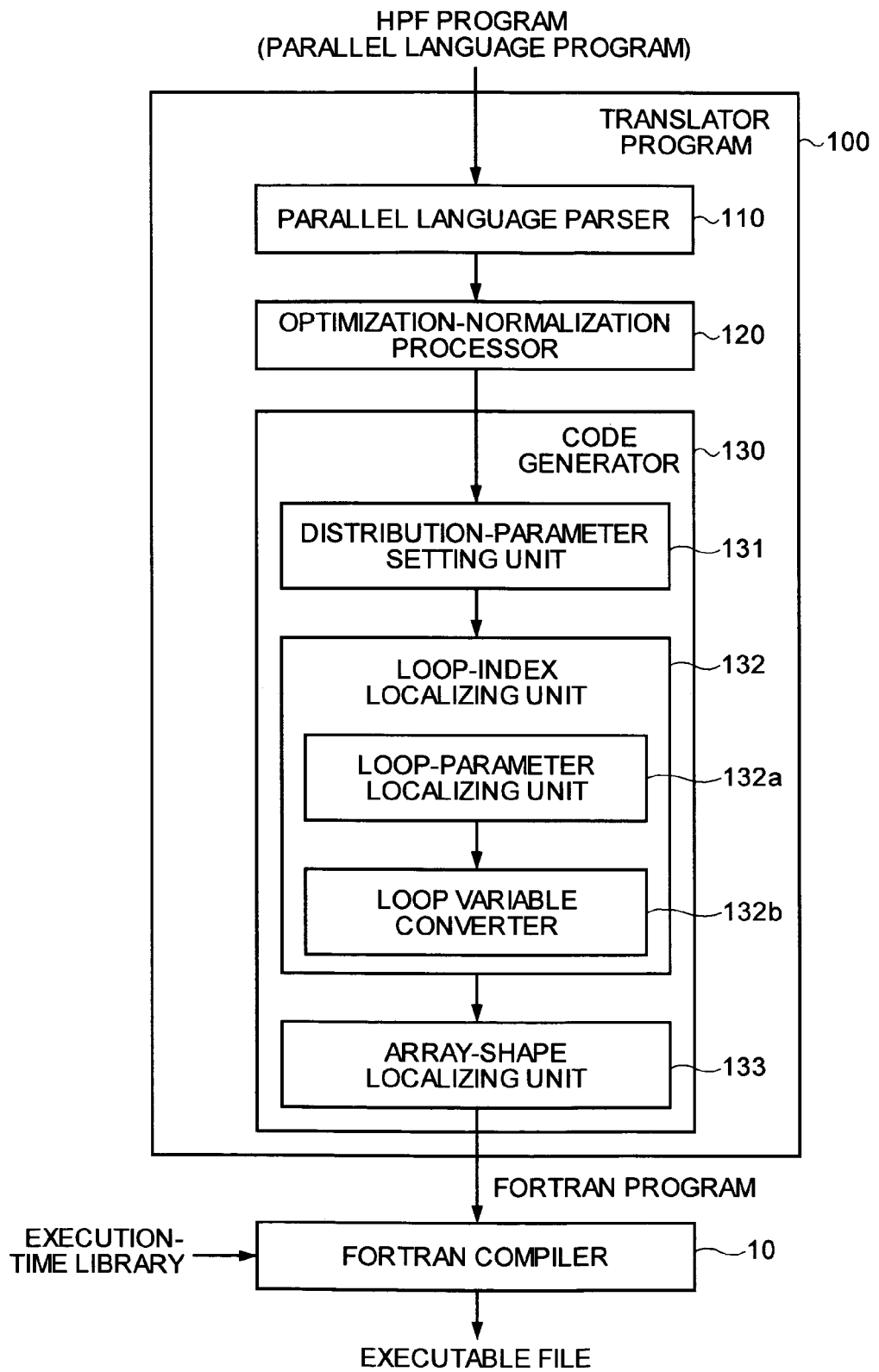
FIG. 2 is a block diagram of a configuration of a translator program according to the embodiment.

FIG. 2 is a functional block diagram of a configuration of a translator program according to the embodiment. A translator program 100 includes a parallel language parser 110, an optimization-normalization processor 120, and a code generator 130.

The parallel language parser 110 receives an HPF program and parses it. The parallel language parser 110 receives the HPF programs as shown in, for example, FIG. 23C, FIG. 25A, and FIG. 26A.

The optimization-normalization processor 120 performs optimization and normalization on the HPF program based on the result of parsing by the parallel language parser 110.

The code generator 130 generates a Fortran program to cause the processors to subject the HPF program optimized and normalized to distributed processing.

The code generator 130 generates a Fortran program with high execution efficiency by localizing the loop index. A Fortran compiler 10 compiles the Fortran program generated and generates an executable file. More specifically, the Fortran compiler 10 joins execution-time libraries such as a message passing library called "MPI" and generates the executable file.

The code generator 130 includes a distribution-parameter setting unit 131, a loop-index localizing unit 132, and an array-shape localizing unit 133.

The distribution-parameter setting unit 131 is a processor that generates execution code for calculating a distribution parameter p for all the distributed dimensions d of a template T upon execution and sets a value calculated as a variable generated. The execution code is generated at each entry point. Alternatively, the value is set as an external variable at an entry of a main program so as to allow the execution code to be visible from all the procedures.

As for another distribution parameter, the distribution-parameter setting unit 131 can also generate execution code for providing a variable generated and setting a value therein. However, if there is a parameter of which value can be obtained at compile time, then execution code for the parameter is not generated.

When the irregular distribution is used, the distribution-parameter setting unit 131 declares a one-dimensional array with a shape (0:N) as a table for obtaining a local index from a global index, and generates code for setting a value defined by a recursion formula as shown in FIG. 3. An array name is a unique name provided in each dimension of the template (herein, "gtol"). The values in the table are different depending on the processors.

When the irregular distribution is used, the distribution-parameter setting unit 131 ensures a region with a shape (0:n−1) as a table for obtaining a global index from a local index, and generates code for setting values of k that are arranged in the ascending order. The values of k are such that each value of M(k) matches a local processor number p. The size n of the table may be set to n=N, but the size is not necessarily too large, that is, the size may be such that the number of values does not overflow from the table by at least the setting. The array name is a unique name provided in each dimension of the template (herein, "ltog").

The loop-index localizing unit 132 is a processor that localizes a loop index, and includes a loop-parameter localizing unit 132a and a loop variable converter 132b.

The loop-parameter localizing unit 132a is a processor that generates code for converting a global index to a local index, before the loop, for a loop L that is aligned to a distributed dimension d of the template T.

FIG. 4A is a diagram of code generated by the loop-parameter localizing unit 132a. The loop-parameter localizing unit 132a generates code for obtaining a local index triplet i1:i2:i3 from a global index triplet I1:I2:I3, before the loop. A computational expression to obtain the local index triplet i1:i2:i3 from the global index triplet I1:I2:I3 can be obtained mathematically, and an example of solutions thereof is explained later. If i1, i2, or i3 can be calculated only by evaluation of one expression, the loop parameter may be directly replaced by the expression.

FIG. 4B is a diagram of code generated by the loop-parameter localizing unit 132a when an increment is not present in a loop parameter. The loop-parameter localizing unit 132a generates code for obtaining local indexes i1:i2 from global indexes I1:I2, before the loop. A computational expression to obtain the local indexes i1:i2 from the global indexes I1:I2 can be mathematically obtained, and an example of solutions thereof is explained later. If i1 or i2 can be calculated only by evaluation of one expression, the loop parameter may be directly replaced by the expression.

FIG. 4C is a diagram of code generated by the loop-parameter localizing unit 132a when the irregular distribution is performed. The loop-parameter localizing unit 132a replaces an initial value and a final value of the loop using the table gtol for obtaining a local index from the global index generated by the distribution-parameter setting unit 131.

If an increment is present in the loop parameter, it is possible to eliminate the increment by converting the loop in the manner as shown in FIG. 5 right before localization of the loop parameter.

The loop variable converter 132b is a processor that detects a reference in a loop variable in the loop L, and replaces the reference with an expression for converting it to a global index. However, if the loop variable is referenced as a subscript expression for local access and the array in the dimension is aligned to a dimension d of the template T, the conversion is not performed. It is noted that a function to convert a local index to a global index can be mathematically obtained, and an example of solutions thereof is explained later.

The array-shape localizing unit 133 is a processor that localizes an array index for the distributed array A that is aligned to the template T. In other words, the array-shape localizing unit 133 replaces the lower bound with 0 and replaces the upper bound with a code that expresses a value smaller by 1 than 1size_sup, for dimensions that are aligned to the dimension d of the array A out of all the distributed dimensions d in the template T.

The value 1size_sup is an arbitrary value higher than max [$1size_q | 0 \leq q < P$], and it is desired that the value be as small as possible to reduce waste of a memory area. The value $1size_q$ is the number of indexes of the dimension divided and allocated to a processor q. The value 1size_sup can be mathematically obtained, and an example of solutions thereof is explained later.

If the irregular distribution is performed, $1size_q$ is the number of elements indicating M(k)=q, but if the waste of the storage area is not a significant matter, 1size_sup=N may be set.

If the irregular distribution is performed, the distribution-parameter setting unit 131 generates a table for obtaining a local index from a global index and a table for obtaining a global index from a local index. However, the loop-parameter localizing unit 132a can also generate code for each loop. In this case, the code is generated not at an entry of the procedure but right before each loop.

FIG. 6 is a flow diagram of a process procedure of the code generator 130. The code generator 130 sets a distribution parameter (step S100), localizes a loop index (step S200), and localizes an array index (step S300) for all the templates T.

In the localization of the loop index at step S200, loop parameters are localized for all the loops L that are aligned to a dimension d, in all the distributed dimensions d of the template T (step S210), and the reference in the loop variable is converted (step S220).

In localization of an array index at step S300, an array shape is localized for all the distributed dimensions d of the template T in all the arrays A that are aligned to the template T (step S310).

As explained above, the code generator 130 performs setting of the distribution parameters, localization of the loop indexes, and localization of the array indexes for all the templates T. Thus, it is possible to generate code with high execution efficiency.

A mutual conversion function between the global index and the local index is explained below. FIG. 7 is a diagram of attributes of distribution D. The distribution D includes a distribution type d, the number of processors P, the extent N of an array, a block width w, a block-width array W, a distributed lower bound B, and a mapping array M.

When the block distribution is performed, a partial expression p w when a local processor number is p may be replaced by myLB in all the functions explained below. When the uneven block distribution is performed, a partial expression B(p) when a local processor number is p may be replaced by myLB in all the functions explained below. Where myLB is a variable having a value obtained by previously evaluating the partial expression p w or the partial expression B(p) for each local processor number p.

For the distribution D, the function gtol is used to obtain a local index i in a processor p corresponding to a global index I, and definition of gtol corresponding to each distribution type d is shown in FIG. 8.

For the distribution D, the function ltog is used to obtain a global index I corresponding to a local index i in a processor p, and definition of ltog corresponding to each distribution type d is shown in FIG. 9.

A function gtol2 is used in the form of (i1, i2)=gtol2(D, I1, I2, p), and is used to obtain i1 and i2 of a local index zone i1:i2 in a processor p corresponding to a global index zone I1:I2, for the distribution D. Definition of gtol2 corresponding to each distribution type d is shown in FIG. 10A and FIG. 10B.

There are other methods of realizing the block distribution as shown in FIG. 10A. A first method thereof is suitable for a case where scalability is most important. More specifically, the first method includes more cases to be discriminated as compared with an original method, and therefore, code generated becomes large, which causes discrimination braches upon execution to increase. However, because it is ensured that the upper bound and the lower bound of a loop after being parallelized range from −1 to w, a large-scale loop incapable of being expressed with, for example, a 4-byte integer is divided so as to be handled with the 4-byte integer.

A function gtol3 is used in the form of (i1, i2, i3)=gtol3(D, I1, I2, I3, p), and is used to obtain i1, i2, and i3 of a local index triplet i1:i2:i3 in a processor p, corresponding to a global index triplet I1:I2:I3, for the distribution D. Definition of gtol3 corresponding to each distribution type d is shown in FIG. 11A to FIG. 11C.

In the cyclic distribution, generally, values of i1 and i2 cannot be generated only by a case (IF statement) and evaluation (assignment statement) using an expression. Therefore, an execution-time library used to perform dynamic calculation is prepared to be joined with an object, the execution-time library is inline-expanded to be inserted into source, or an execution procedure is generated with a language such as Fortran at compile time and is joined with an object (see Japanese Patent Application No. 2000-596451).

A function Lsize_sup is used in the form of n_sup=1size_sup(D), and is used to obtain, of the sizes of distribution D after being distributed, a value equal to the maximum value among processors or a value as small as possible of values greater than the maximum value. Definition of Lsize_sup corresponding to each distribution type d is shown in FIG. 12.

The processing of the code generator 130 for the input example 1 as shown in FIG. 23C is explained below. FIG. 13A is an image of internal expression input by the code generator 130 for the input example 1 as shown in FIG. 23C.

As shown in FIG. 13A, the translator program 100 adds discrimination such that the loop is distributed along a first dimension of the array A, when the loop distributed is converted to internal expression, and the lower bound of the array and the initial value of DO loop are normalized to zero. Note that the normalization is not essential processing. Therefore, instead of the normalization, a mutual conversion expression between a global index and a local index may be corrected in consideration of the lower bound. Alternatively, the normalization may be performed by using an invention described in Japanese Patent Application No. 2003-316137.

Assume that access to three locations of the array A is local, that is, the access can be ensured by pre-processing without communications between processors. The local access can be detected by the invention described in Japanese Patent Application No. 2003-316137. A method of excluding access that is not local to the outside of the parallel loop can be realized by using a technology described in Japanese Patent No. 3261239 and other existing technologies. Here, the HPF program is used as the input example, but the result of analysis by an automatic parallelizing compiler or code generated by a tool may be made an input to the code generator 130.

At step S100, the code as follows is inserted into an entry point to store a processor number p in a variable myID. A virtual processor number returned from the MPl library is used as a value of the code as it is.

CALL    mpi_comm_rank(MPl_COMM_WORLD, myID, . . . )

Other parameters of the block distribution are as follows:

$$N=1000, P=4, w=[N/P]=250 \quad (3)$$

and these are constants, and therefore, the parameters are not generated as execution code.

At step S200, a loop aligned to the template is only "do 1".

At step S210, since a loop index is I1=0 and I2=999, the initial value i1 and the end value i2 after conversion can be calculated as follows by the function gtol2 for the block distribution. Codes corresponding to these values are generated right before the loop.

$$i1 = -250^* myID \text{ for } myID \le 0$$
$$= 0 \text{ for } myID > 0$$
$$i2 = 249 \text{ for } myID < 3$$
$$= 999 - 250^* myID \text{ for } myID \ge 3$$

At step S220, the loop variable 1 is referenced in three places in the loop, and all the references correspond to the condition of performing no conversion.

At step S300, an object variable is only A, and a distributed dimension is a first dimension. Since w=250, the shape of the first dimension of A is 0:249.

Figure 24A:
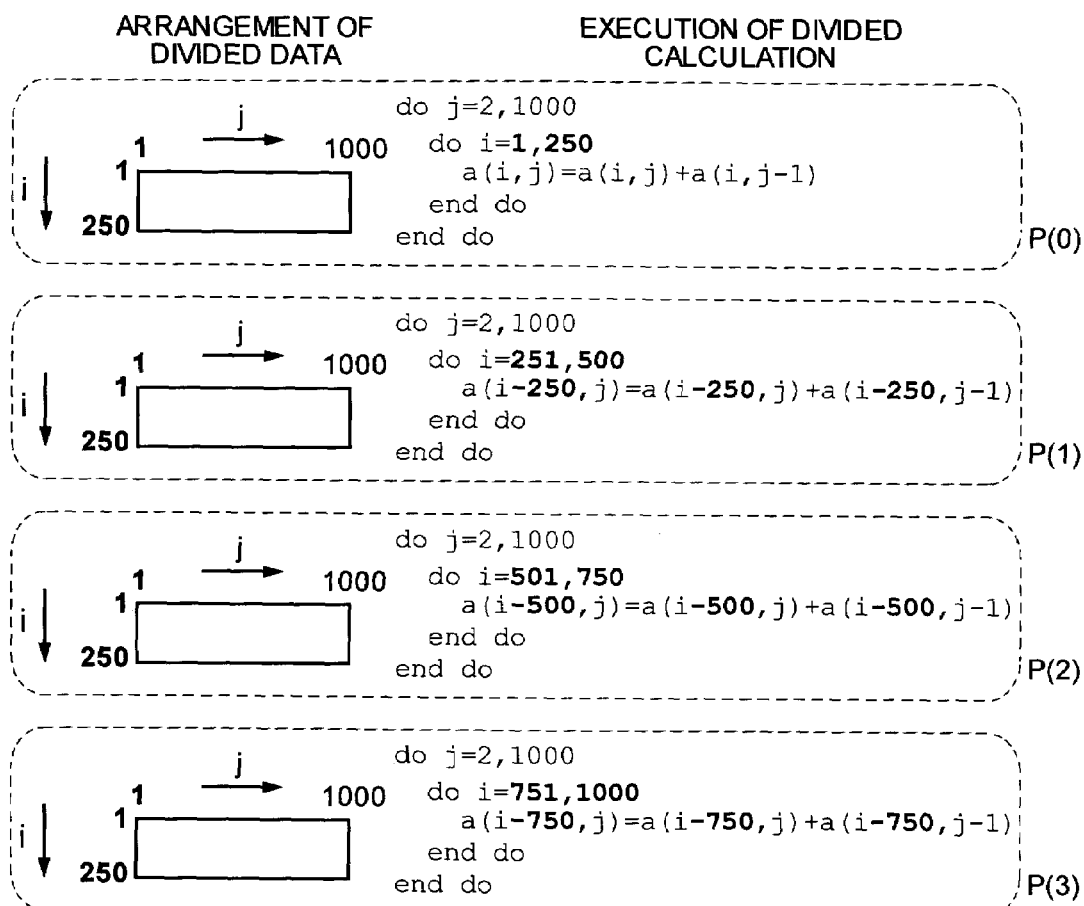
FIG. 24A is a schematic of a correspondence between divided indexes of data or loop and each processor.

The result of the conversion is as shown in FIG. 13B. Ranges indicated by boldface are portions newly generated or replaced (hereinafter the same). Furthermore, by subjecting the portions to existing optimization such as constant propagation and constant convolution, the code simplified as shown in FIG. 13C can be obtained. This code matches the result as shown in FIG. 1A. By comparing this code simplified with the code output by a conventional compiler as shown in FIG. 24B, it is understood that the subscript expression in the array access becomes simpler.

The processing of the code generator 130 for the input example 2 as shown in FIG. 25A is explained below. FIG. 14A is an image of internal expression input by the code generator 130 for the input example 2 as shown in FIG. 25A.

At step S100, similarly to the input example 1, code for setting p in myID is generated. N=1000, P=4, and w=5.

At step S200 and step S210, since I1=1 and I2=998, the initial value i1 and the end value i2 after conversion can be calculated by the function gtol2 for the block-cyclic distribution as shown in FIG. 14B. Codes corresponding to these values are generated right before the loop. Because an available range for p is from not less than 0 to less than P, the case of p<0 in the calculation of i1 and the case of p>3 in the calculation of i2 can be omitted.

At step S220, conversion is not performed.

At step S300, $$w=[N/(Pw)]=250 \quad (4)$$

Therefore, the shape of the first dimension of A is 0:249.

The result of the conversion is shown in FIG. 14C. Furthermore, by optimizing so as to shift IF block in an outer loop to the outside of the loop, the code matches the result as shown in FIG. 1B. In the conventional code as shown in FIG. 25C, a DO loop nest is made deep, and the cost of loop execution is thereby increased, but in this example, the depth of the DO loop is not made changed. Furthermore, the subscript expression does not become complicated.

The processing of the code generator 130 for the input example 3 as shown in FIG. 26A is explained below. FIG. 15A is an image of internal expression input by the code generator 130 for the input example 3 as shown in FIG. 26A.

At step S100, execution code for setting a processor number p in myID is generated in the same manner as that of the input example 1. Using the following codes, a mapping array M is set in mapArray (0:11) upon execution.

mapArray=MAP-1 or
do l=0, 11
mapArray(I)=MAP(I-1)-1
end do

Setting MAP-1 herein indicates a shift for normalizing the lower bound of the processor array to zero. The code generator 130 declares conversion tables gtol (0:12) and ltog (0:11), and generates execution code for setting a value as follows.

gtol(0)=0
i=0
do k=0, 11
if (myID. EQ. mapArray (k)) then
  ltog(i)=k
  i=i+1
  end if
gtol(k+1)=i
end do At step S200, the initial value M of the DO statement is replaced by gtol(M) and the end value N is replaced by gtol(N+1)-1. The variable l is referenced in four places in the loop, but one of the four places does not correspond to the condition of performing no conversion, and therefore, the relevant variable is converted. In other words, only the variable l appearing in the third place is replaced by ltog(I).

At step S300, since N=12, the shape of the first dimension of A is 0:11.

The result of the conversion is shown in FIG. 15B. This result matches the result as shown in FIG. 1C. In the conventional code as shown in FIG. 26C, all the processors execute all the ranges of an inner loop, which makes it difficult to obtain effects due to parallelism. In this example, however, the ranges executed by each of the processors are reduced to only the range which each processor takes charge of.

The processing of the code generator 130 for the cyclic distribution is explained below. FIG. 16A is an image of internal expression input by the code generator 130.

At step S100, similarly to the input example 1, code for setting p in myID is generated. N=24 and P=6.

At step S200 and step S210, since I1=4, I2=20, and I3=4, the initial value i1, the end value i2, and an increment i3 after conversion are calculated by the function gtol3 for the cyclic distribution.

(1) t=GCD(P,|I3|)=GCD(6, 4)=2 is obtained through calculation at compile time.

Figure 17:
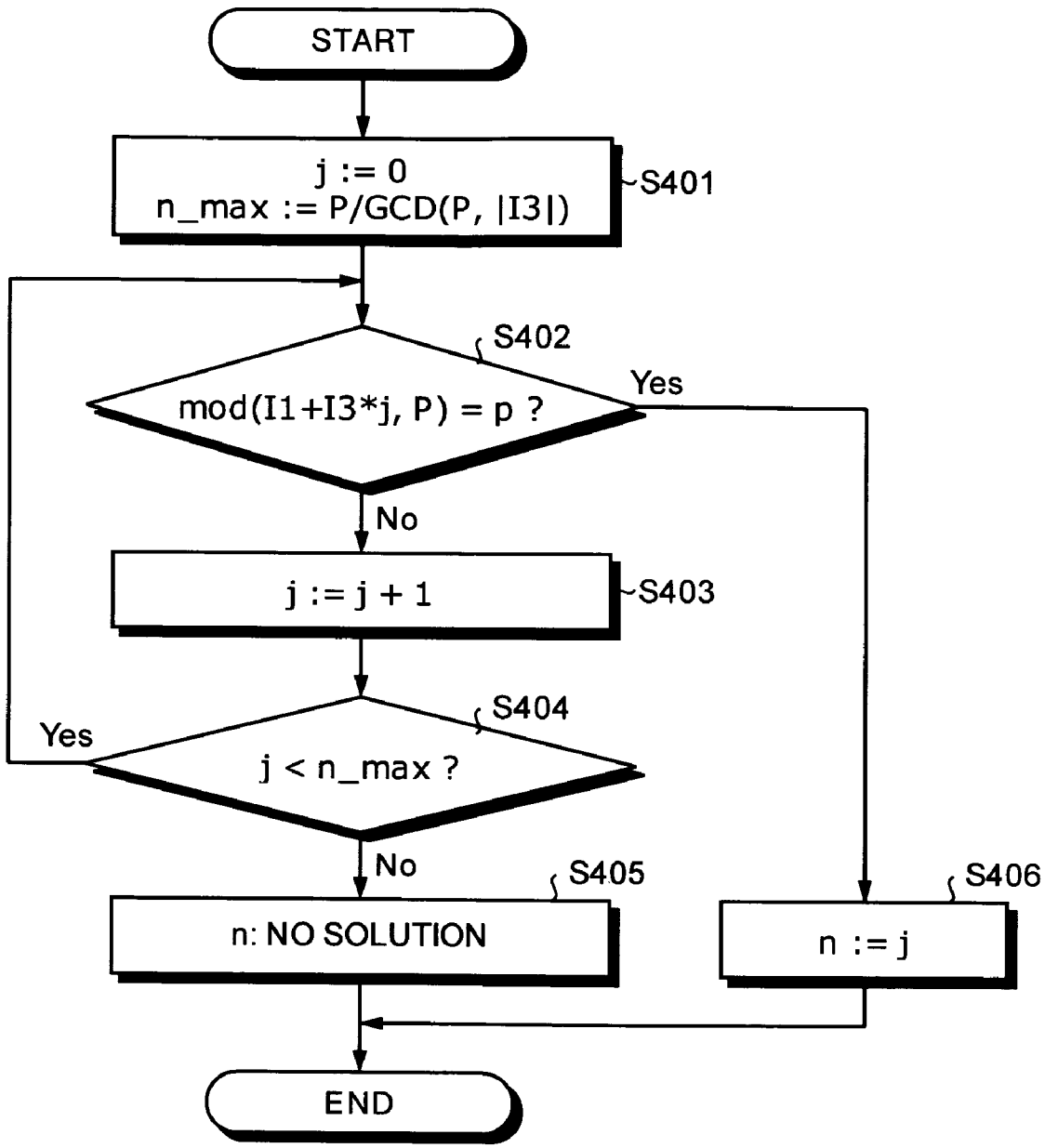
FIG. 17 is a flowchart of a process for obtaining "n" in a computational expression of cyclic distribution.

(2) Source code that realizes the processes of FIG. 17 (step S401 to step S406) is generated as a Fortran external function at compile time. Herein, the Fortran external function serves as an interface whose function name is set to "cyclic_f", and returns "−1" if there is no solution.

(3) Code for calling cyclic_f and assigning the returned value in a variable n_cyc is generated before DO loop.

(4) The whole DO loop is surrounded by IF block so that the DO loop is executed only when the value of n_cyc is not −1.

(5) Code for replacing DO loop parameters with variables k1, k2, and k3 and obtaining values of k1, k2, and k3 is generated right before the DO loop.

At step S220, the variable k is referenced in two places in the loop, and one of the variables k that is in the right side expression does not correspond to the condition of performing no conversion, and therefore, the relevant variable k is converted. In other words, k of expression i*j*k is replaced by (6*k+myID) according to the function ltog.

At step S300, in the shape of an object variable X, the lower bound is replaced by zero, and the upper bound is replaced by the following equation (5).

$$lsize\_max=[N/P]-1=3 \quad (5)$$

The result of the conversion is shown in FIG. 16B. Output code includes the source code of the function cyclic_f. As another method of realizing the code, the function cyclic_f may be prepared in advance as a fixed library to be set as a part of the system so that the function cyclic_f is joined with the output code if required. Alternatively, the function cyclic_f is expanded in the output code by inline expansion. In this example, the greatest common divisor is calculated at compile time. However, the greatest common divisor may be generated as a source program in the same manner as that of the function cyclic_f, it may be inline-expanded, or it may be joined with the output code as a library.

The processing of the code generator 130 for distribution over multi-dimension is explained below. FIG. 18A is an image of internal expression input by the code generator 130. The lower bound of an array is 0, and conversion from the array to a template is considered from a state in which the array is normalized to an identity alignment. It is assumed that all the accesses to data are ensured as local accesses by the pre-processing. These normalization and pre-processing can be performed in advance as required.

Figures 18B, 18C:
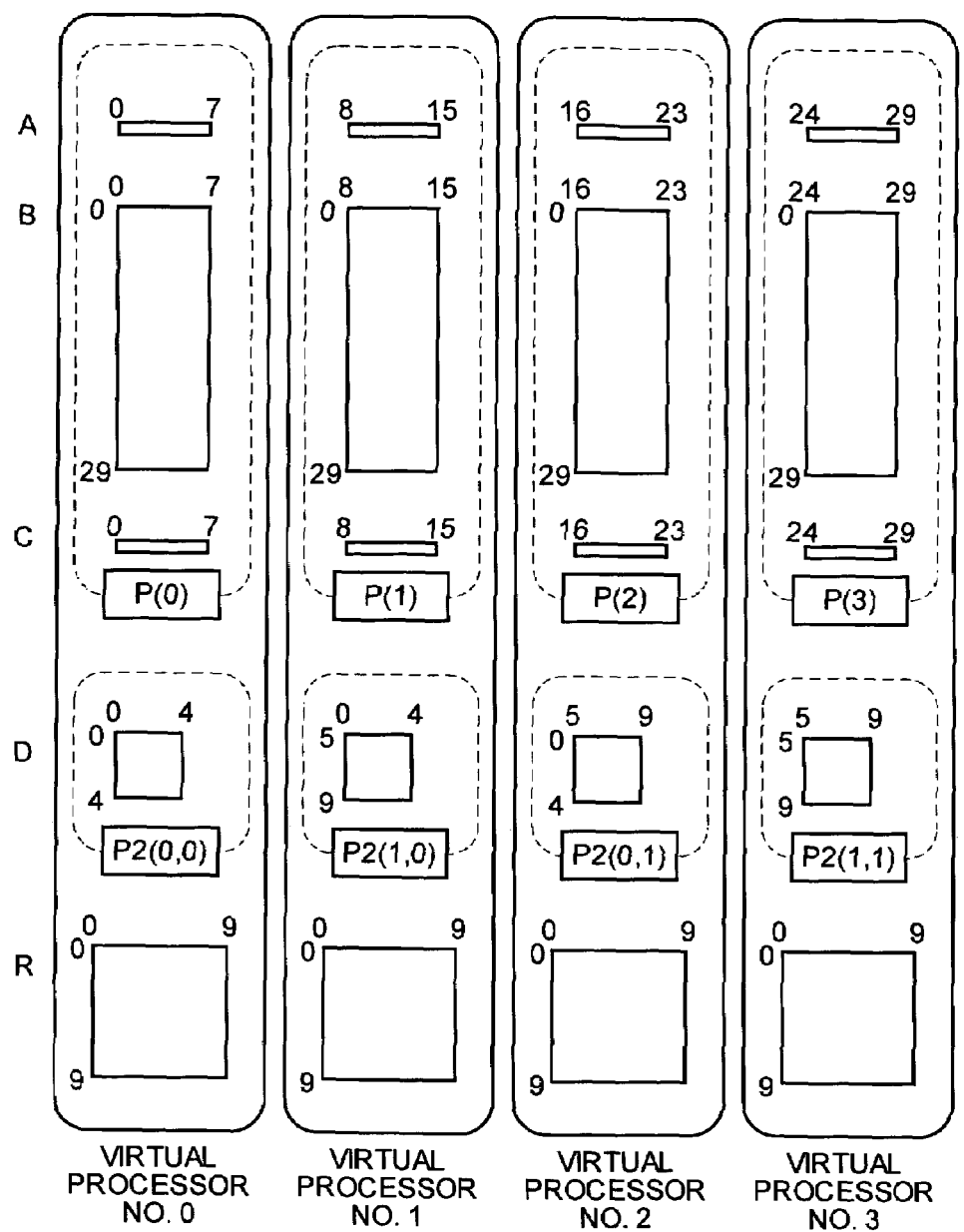
FIG. 18B is a schematic of specified data distribution.
FIG. 18C is a schematic of values for loop parameters.

The input program expresses the data distribution as shown in FIG. 18B. In other words, an array A and an array C are block-distributed to a processor group P. A second dimension of an array B is block-distributed to the processor group P. In an array D, two-dimensional block distribution is performed on a two-dimensional processor group P2. An array R is not distributed, and replicas of the array R are arranged in all the processors. A correspondence between the processor group P and the processor group P2 is as shown in FIG. 18B.

At first, the following processes are performed on a template T1.

At step S100 in order to store a processor number p for the template T1 in the variable myID1, the following code is inserted into an entry point. A virtual processor number returned from the MPl library is used as a value of the code as it is.

CALL mpi_comm_rank(MPl_COMM_WORLD, RANK, ... )

myID1=RANK

All of other distribution parameters for the template T1 are constants, and N=30, P=4, and w=8. In order to reduce the number of evaluations of expression p w i.e., 8*myID1 that represents the divided lower bound of a local processor, the following code is generated.

$myLB1 = 8*myID1$

At step S200, the loop that is aligned to the template T1 is only L1.

At step S210, since I1=1 and I2=28, the initial value i1 and the end value i2 after conversion can be calculated by the function gtol2 for the block distribution as shown in FIG. 18C. Code to be executed right before the loop L1 is generated so as to enable setting of these values in the initial value and the end value of the loop through the variables ib1 and ie1 upon execution.

At step S220, the loop variable i in the loop L1 s referenced in four places on line 14 and 2 places on line 16 of the program as shown in FIG. 18A. Of these loop variables i, the loop variable i appearing in the first subscript expression of the variable B on line 14 and the loop variable i appearing in the right side on line 16 do not correspond to the condition of excluding it from the object, and therefore, the variables i are replaced by (i+myLB1) according to the function ltog for the block distribution.

At step S300, variables that are aligned to the template T1 are A, B, and C. As for the declaration type of A, the lower bound of declaration of a dimension that is aligned to the template T1 is converted to 0 and the upper bound thereof is converted to w-1, i.e., constant 7. The conversion is performed in the same manner as explained above on the declaration type in the second dimension of B and on the declaration type of C.

The image after conversion so far is shown in FIG. 18D. Information for alignment of the template T1 and the variables A, B, and C are made unnecessary here.

The following processes are performed on a template T2.

At step S100, a correspondence between a multi-dimensional processor group and processors specified by the user depends on language specification of the input program, the method of mounting the processors, and conversion specification of the execution-time library. A correspondence as shown in FIG. 18E is performed herein. In this case, p1 and p2 are obtained by the following expressions.

$p1 = \mathrm{mod}\,(\mathrm{rank}, 2)$ $$p2 = [\mathrm{rank}/2] \qquad (6)$$

For dimension d=1, code for setting a processor number p1 in variable myID2 is generated as follows.

$myID2 = \mathrm{MOD}(\mathrm{RANK}, 2)$

Other distribution parameters are as follows: N1=30, P1=2, and w=5. Code p1*w=5*myID2 is set in variable myLB2.

For dimension d=2, code for setting a processor number p2 in variable myID3 is generated as follows.

$myID3 = \mathrm{RANK}/2$

Other distribution parameters are as follows: N2=30, P2=2, and w=5. Code p2*w=5*myID3 is set in variable myLB3.

At step S200, the following processes are performed on the first dimension of the template T2. The loop aligned to the first dimension of the template T2 is only L2.

At step S210, since I1=0 and I2=j, the lower bound ib2 and the upper bound ie2 of L2 can be calculated using the function gtol2 as shown in FIG. 18F. Since myID2 is equal to or more than 0, the value of ib2 becomes always constant 0. The calculation can be simplified in the above manner through optimization.

At step S220, a loop variable i in the loop L2 is referenced in two places on line 26 of the program as shown in FIG. 18A. Of these loop variables i, the loop variable i appearing in the subscript expression of a non-distributed array R does not correspond to the condition of excluding it from the object, and therefore, the relevant loop variable i is replaced by i+myLB2 using the function ltog.

The following processes are performed on the second dimension of the template T2. The loop aligned to the second dimension of the template T2 is only L3.

At step S210, since I1=4, I2=9, and I3=2, a lower bound ib3 and a upper bound ie3 of L3, and an increment is3 are calculated, as shown in FIG. 18G, by using the case of the function gtol3, the block distribution, and 13>0. Code to be executed right before the loop L3 is generated so as to set the values in the initial value and the end value of the loop through the variables ib3 and ie3 upon execution. Since is3 is a constant, it is directly set in the increment of DO statement.

At step S220, a loop variable j in the loop L3 is referenced in two places on line 26 of the program as shown in FIG. 18A. Of these loop variables j, the loop variable j appearing in the subscript expression of the non-distributed array R does not correspond to the condition of excluding it from the object, and therefore, the relevant loop variable j is replaced by i+myLB3 using the function ltog.

At step S300, a variable aligned to the template T2 is only D. At first, the lower bound in the first dimension of D is converted to 0, and the upper bound thereof is converted to w-1, i.e., constant 4. Furthermore, the lower bound in the second dimension of D is converted to 0, and the upper bound thereof is converted to w-1, i.e., constant 4.

The code to be finally output through the procedure is shown in FIG. 18H.

Figure 19:
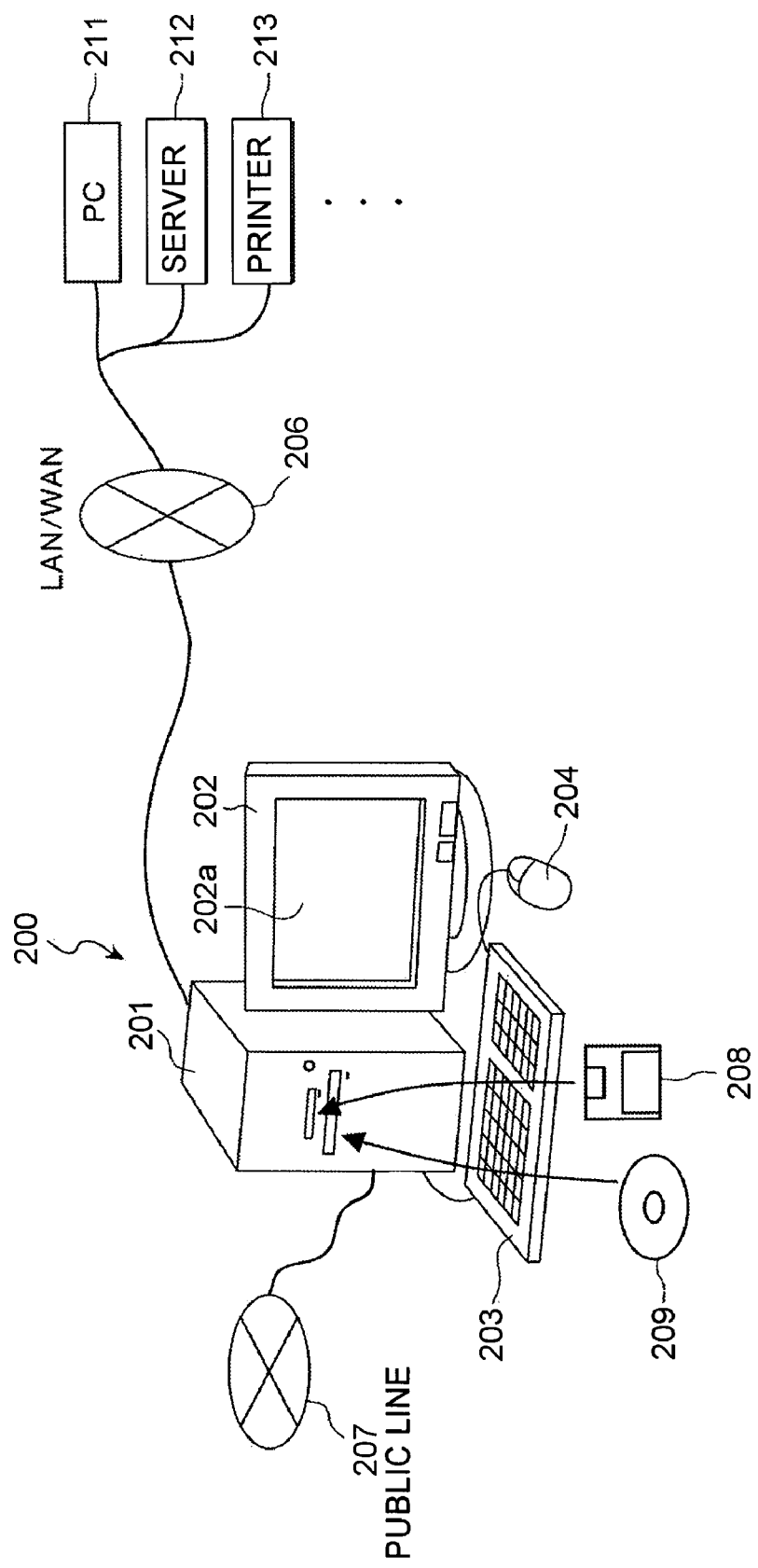
FIG. 19 is a schematic of a computer system that executes a translator program according to the embodiment.

FIG. 19 is a schematic diagram of a computer system that executes a translator program according to the embodiment.

As shown in FIG. 19, a computer system 200 includes a main body 201, a display 202 that displays information on a screen 202a according to an instruction from the main body 201, and a keyboard 203 for entering various pieces of information to the computer system 200. The computer system 200 also includes a mouse 204 for specifying an arbitrary position on the screen 202a of the display 202, a local area network (LAN) interface connected to a LAN 206 or to a wide area network (WAN), and a modem connected to a public line 207. The LAN 206 connects the computer system 200 to another computer system (PC) 211, a server 212, and a printer 213.

Figure 20:
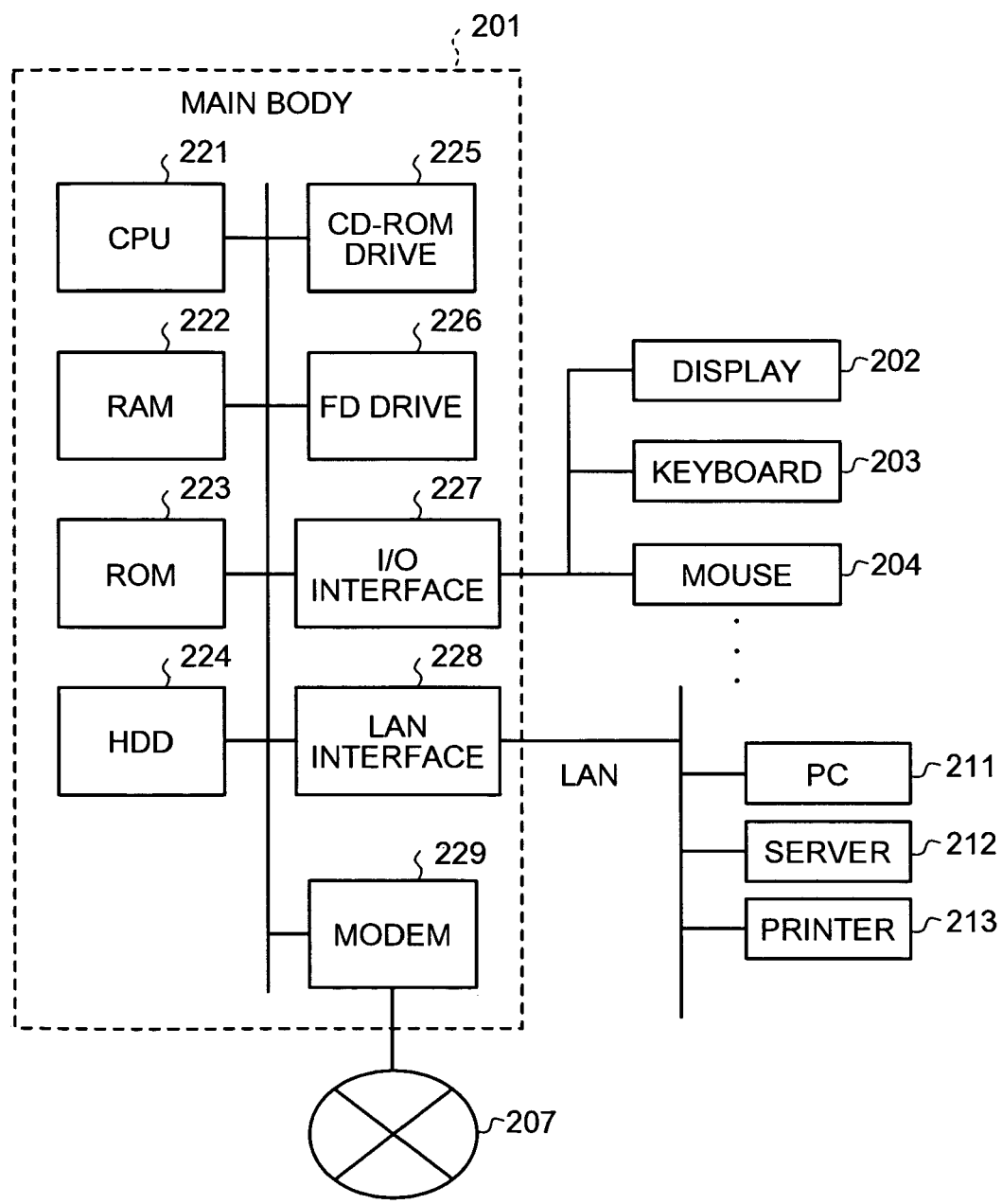
FIG. 20 is a block diagram of a configuration of a main body shown in FIG. 19.
Figure 21A:
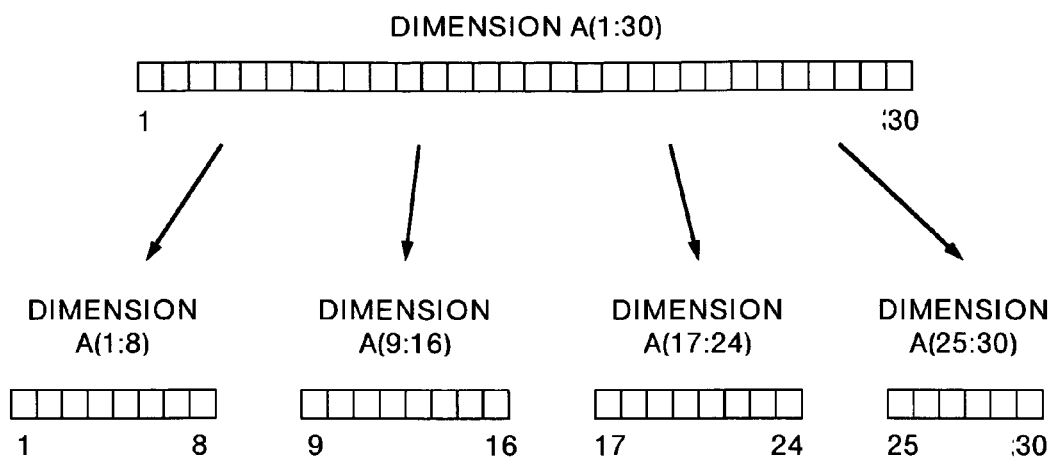
FIG. 21A is a schematic of data distribution.
Figure 21B:
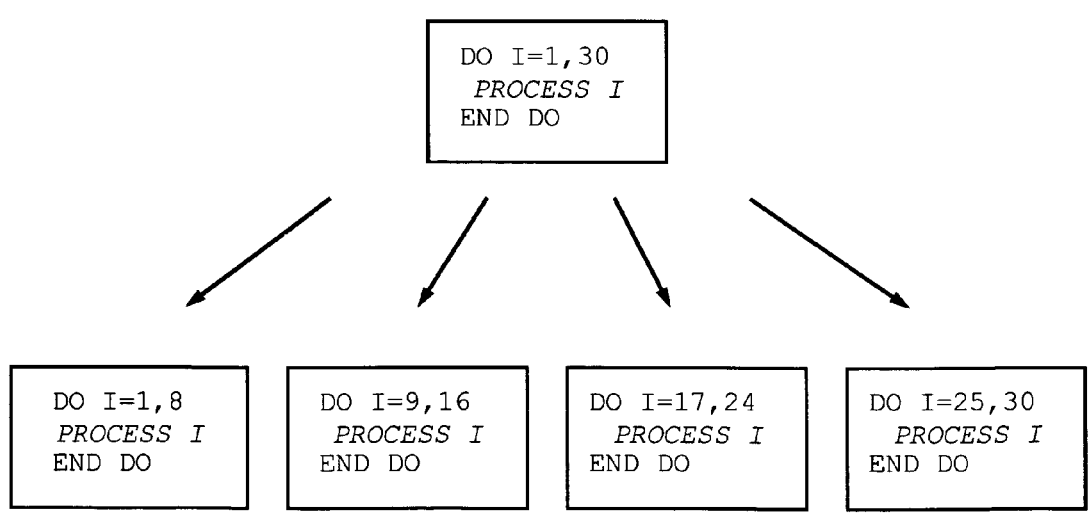
FIG. 21B is a schematic of loop distribution.

FIG. 20 is a functional block diagram of a configuration of the main body 201 as shown in FIG. 19. The main body 201 includes a CPU 221, a random access memory (RAM) 222, a read only memory (ROM) 223, a hard disk drive (HDD) 224, a compact disk-read only memory (CD-ROM) drive 225, a floppy disk (FD) drive 226, an input-output (I/O) interface 227, a LAN interface 228, and a modem 229.

The translator program executed in the computer system 200 is recorded in any portable recording medium such as an FD 208, a CD-ROM 209, a digital versatile disk (DVD), a magneto-optical disk, and an integrated circuit (IC) card. The translator program recorded is read from one of the recording media to be installed in the computer system 200.

Alternatively, the translator program is stored in a database of the server 212 connected to the computer system 200 through the LAN interface 228, or in a database of the another computer system (PC) 211. The translator program stored is read from one of these databases to be installed in the computer system 200.

The translator program installed is stored in the HDD 224, and is executed by the CPU 221 using the RAM 222 and the ROM 223.

As explained above, in the embodiment, the distribution-parameter setting unit 131 generates the code for setting a parameter for distribution in each processor, the loop-index localizing unit 132 localizes the index of a loop, and the array-shape localizing unit 133 localizes an distributed array. Therefore, index conversion in the subscript expression can be avoided, which makes it possible to reduce overhead caused by the index conversion.

In the program generated by the translator program 100 according to the embodiment, expressions for the upper bound and the lower bound of the loop are made simpler, and there are many cases where the expressions are made to change those independent on a processor number or made to be changed to constants. The upper bound and the lower bound are thereby defined at compile time, which causes ordinary optimization to be promoted. Even if a sequential loop is present outside a parallel loop, optimization such as loop conversion and loop coalescing is easily performed. Furthermore, the cost of loops is easily estimated at compile time.

In the program generated by the translator program 100 according to the embodiment, the cost at an entrance of a parallel loop is extremely low. Therefore, even if an inner loop is parallelized, performance thereof is not reduced so much, which allows an increase in flexibility of application programs. In the conventional technology, because the cost of the parallel loop is high at the entrance, it is thought better that parallelism of loops is performed in the outermost loop.

In the program generated by the translator program 100 according to the embodiment, an absolute value of an index handled can be minimized by localizing an index in the loop or the array. Therefore, even if there is such an enormous array or an enormous loop that an index thereof cannot be expressed with 32-bit integer, it can be handled with 32 bits by parallelism.

In the program generated by the translator program 100 according to the embodiment, array allocation can be compressed to a continuous region, which allows economizing on a memory area. Furthermore, since an access range is localized, cache efficiency is improved.

In the program generated by the translator program 100 according to the embodiment, the loop can be made single without mask. In other words, the loop is made doubled in the conventional block-cyclic distribution, but the loop can efficiently be made single if it does not have an increment. Furthermore, even if it has an increment, the loop can be made single by using mask. Conventionally, the irregular distribution is mounted in the program only by access with mask, but the loop can efficiently be made single if it does not have an increment.

In the program generated by the translator program 100 according to the embodiment, transmission/reception is performed in a natural manner between procedures for distributed arrays, which allows natural response even to unmatched in a dimension number or a shape between an actual argument and a dummy argument.

In the embodiments, the parallel programming language based on Fortran is explained. However, the present invention is not limited to the embodiments. For example, the present invention can be used in parallel programming languages based on other programming languages such as C in the same manner as explained above.

According to the present invention, the overhead caused by the loop index conversion can be reduced, which allows reduction in execution efficiency of the loop to be prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A program converting method executed by a processor for analyzing a parallel language program and converting the parallel language program into a sequential language program that is subject to a distributed processing by a plurality of processors, the method comprising:
   generating a setting code for setting a value in a distribution parameter for each of the plurality of processors;
   generating a localizing code before a loop that is aligned to a template, the localizing code being for localizing indexes in the loop and for converting a global index to a local index, and referencing loop variable as a subscript; and
   localizing an array index for an array, and performing the converting unless the array is aligned to a template for use in array distribution to the plurality of processors, thereby excluding the subscript from a loop index calculation.

2. The program converting method according to claim 1, wherein the generating the localizing code includes
   localizing the loop parameter; and
   converting a loop variable into a global index.

3. The program converting method according to claim 1, wherein a distribution type that is specified in the parallel language program includes an uneven block distribution and an irregular distribution.

4. The program converting method according to claim 3, wherein the distribution type that is specified in the parallel language program further includes a block distribution, a cyclic distribution, and a block-cyclic distribution.

5. The program converting method according to claim 1, wherein the parallel language program is generated by using a parallel programming language based on FORTRAN.

6. The program converting method according to claim 1, wherein the generating the setting code includes generating the setting code for setting the value at an entrance of each procedure.

7. The program converting method according to claim 2, wherein the localizing the loop parameter includes converting an initial value and a final value of a loop into local indexes.

8. A computer-readable recording medium that stores a translator program for analyzing a parallel language program and converting the parallel language program into a sequential language program that is subject to a distributed processing by a plurality of processors, the translator program making a computer execute:
   generating a setting code for setting a value in a distribution parameter for each of the plurality of processors;
   generating a localizing code before a loop that is aligned to a template, the localizing code being for localizing indexes in the loop and for converting a global index to a local index, and referencing a loop variable as a subscript; and
   localizing an array index an array, and performing the converting unless the array is aligned to a template for use in array distribution to the plurality of processors, thereby excluding the subscript from a loop index calculation.

9. The computer-readable recording medium according to claim 8, wherein the generating the localizing code includes
   localizing the loop parameter; and
   converting a loop variable into a global index.

10. The computer-readable recording medium according to claim 8, wherein a distribution type that is specified in the parallel language program includes an uneven block distribution and an irregular distribution.

11. The computer-readable recording medium according to claim 10, wherein the distribution type that is specified in the parallel language program further includes a block distribution, a cyclic distribution, and a block-cyclic distribution.

12. The computer-readable recording medium according to claim 8, wherein the parallel language program is generated by using a parallel programming language based on FORTRAN.

13. The computer-readable recording medium according to claim 8, wherein the generating the setting code includes generating the setting code for setting the value at an entrance of each procedure.

14. The computer-readable recording medium according to claim 9, wherein the localizing the loop parameter includes converting an initial value and a final value of a loop into local indexes.

15. A translator apparatus for analyzing a parallel language program and converting the parallel language program into a sequential language program that is subject to a distributed processing by a plurality of processors, the translator apparatus comprising:
   a memory that installs a translator program; and
   a CPU that executes the translator program, wherein
   the translator program, which when executed by the CPU, causes the CPU to perform function as
   a parameter generating unit that generates a setting code for setting a value in a distribution parameter for each of the plurality of processors; and
   an index localizing unit that generates a localizing code before a loop that is aligned to a template, the localizing code being for localizing indexes in the loop and for converting a global index to a local index, and localizes an array index for an array, wherein the conversion of the global index to the local index is preformed unless a loop variable is referenced as a subscript and the array is aligned to a template for use in array distribution to the plurality of processors, thereby excluding the subscript from a loop index calculation.

* * * * *